(12) United States Patent
Keas

(10) Patent No.: US 9,160,260 B1
(45) Date of Patent: Oct. 13, 2015

(54) ADAPTIVE ACTUATOR CONTROL SYSTEM

(71) Applicant: Moog Inc., East Aurora, NY (US)

(72) Inventor: Paul James Keas, San Jose, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/305,551

(22) Filed: Jun. 16, 2014

(51) Int. Cl.
*H02P 7/00* (2006.01)
*H02P 6/00* (2006.01)

(52) U.S. Cl.
CPC .................................. *H02P 6/002* (2013.01)

(58) Field of Classification Search
USPC ............. 318/400.01, 400.02, 400.14, 400.15,
318/400.07, 400.23, 432, 700, 701, 727,
318/799, 800, 434, 611, 623, 632; 388/800,
388/823, 902
See application file for complete search history.

(56) References Cited

U.S. PATENT DOCUMENTS 7,952,308 B2 * 5/2011 Schulz et al. ............ 318/400.23
8,704,469 B2 * 4/2014 Tadano ..................... 318/400.02

* cited by examiner

*Primary Examiner* — Antony M Paul
(74) *Attorney, Agent, or Firm* — Phillips Lytle LLP

(57) ABSTRACT

A system and method for acoustic quieting and reduction of vibration of an electromechanical actuator ("EMA") accomplished by using closed loop control techniques using vibration feedback from an EMA mounted sensor to modify the current command in the motor drive electronics to minimize the resultant motor torque ripple.

34 Claims, 31 Drawing Sheets $$\tau_r(\theta) = \sum_{n=1}^{N} A_n \sin(n\theta) + B_n \cos(n\theta)$$

where:
$\theta$ = Motor shaft position
$n$ = Harmonic number
$A_n, B_n$ = Fourier Coefficients of $\tau_r(\theta)$

| Apply Ic 0 | | Apply Ic 1 | |
|---|---|---|---|
| Acquire revolutions 1-N1 | | Acquire revolutions N1+1 -N2 | |
| Process revolution 1-N1 | | Process revolution N1+1 -N2 | |
| | update Ic 1 | | update Ic 2 |

Effect of Active Damping on $H_2(s)$

ADAPTIVE ACTUATOR CONTROL SYSTEM

STATEMENT REGARDING FEDERALLY SPONSORED RESEARCH OR DEVELOPMENT

This invention was made with government support under Contract No. N0014-10-C-0350 awarded by the Office of Naval Research. The government has certain rights in the invention.

TECHNICAL FIELD

The present invention relates generally to control systems and specifically to an adaptive motor control system.

BACKGROUND ART

Electric actuators are generally known. As illustrated in FIG. 1, electric actuators often contain five basic elements: power conversion 200; control power electronics 203; an electric motor as the prime mover 206; mechanical components such as gears, screws and bearings for motion conversion 209; and sensors.

Each of these elements may contribute to the vibration signature of the actuation system. Previous studies have concentrated on the electric motor and the mechanical components as the main focus. These studies have sought to reduce the disturbance at the source by modifying the motor and mechanical components. One result of this work is a permanent magnet motor modeling tool that was developed by Applied Physical Sciences. The use of this tool allowed the designer to identify excitation frequencies within the motor, and thereby modify the motor design to minimize these frequencies. Similarly, the forcing frequencies from the mechanical components could be determined from known kinematics equations.

SUMMARY OF THE INVENTION

With parenthetical reference to the corresponding parts, portions or surfaces of the disclosed embodiment, merely for the purposes of illustration and not by way of limitation, provided is a system and method for acoustic quieting of an electromechanical actuator ("EMA") accomplished by using closed loop control techniques using vibration feedback from an EMA mounted sensor to modify the current command in the motor drive electronics to minimize the resultant motor torque ripple. This technology can also be applied to reduce vibrations transmitted to nearby systems or to reduce direct propagation to "jitter" in precision motion control applications.

It is known that electromagnetic forces induced in brushless DC motors affect the actuator structure and can excite resonance frequencies within the unit. Therefore, reducing these effects is required.

One aspect of the present invention has yielded new technology capable of reducing the noise and vibration associated with EMAs via modifications to the electrical circuits and signal processing algorithms internal to the Brushless Direct Current (BLDC) motor drives.

One aspect of the invention is to provide an accurate model of the overall system. This model was used in the development of noise reduction and active cancellation methods aimed at the minimization of overall vibration.

In a first embodiment of the invention, an adaptive motor control system comprises a predetermined current command (600) ($I_{qc}$) corresponding to a desired output torque, a sensed motor shaft angular position (θ), and a measured response ($y_2$). A processor (603) is configured to run an adaptive algorithm. The adaptive algorithm comprises an adaptive torque ripple cancellation stage (606) configured to produce a torque ripple cancellation signal (609) ($I_c$) as a function of said predetermined current command (600), said sensed angle (θ) and said measured response ($y_2$). A model reference adaptive inverse controller (612) is configured to produce a current command adjustment (613) to effect a delayed y2 response proportional to said torque ripple cancellation signal (609) and said measured response ($y_2$). An active damping feedback control loop (615) is configured to produce a damping signal (618) as a function of said measured response ($y_2$). A summation block (621) is configured to produce an output current command signal (624) as a function of said current command adjustment (613), predetermined current command (600) and said damping signal (618). The algorithm is configured to cause a motor driven by said output current signal (624) to produce the desired output torque with reduced noise.

DESCRIPTION OF EMBODIMENTS

Figure 1:
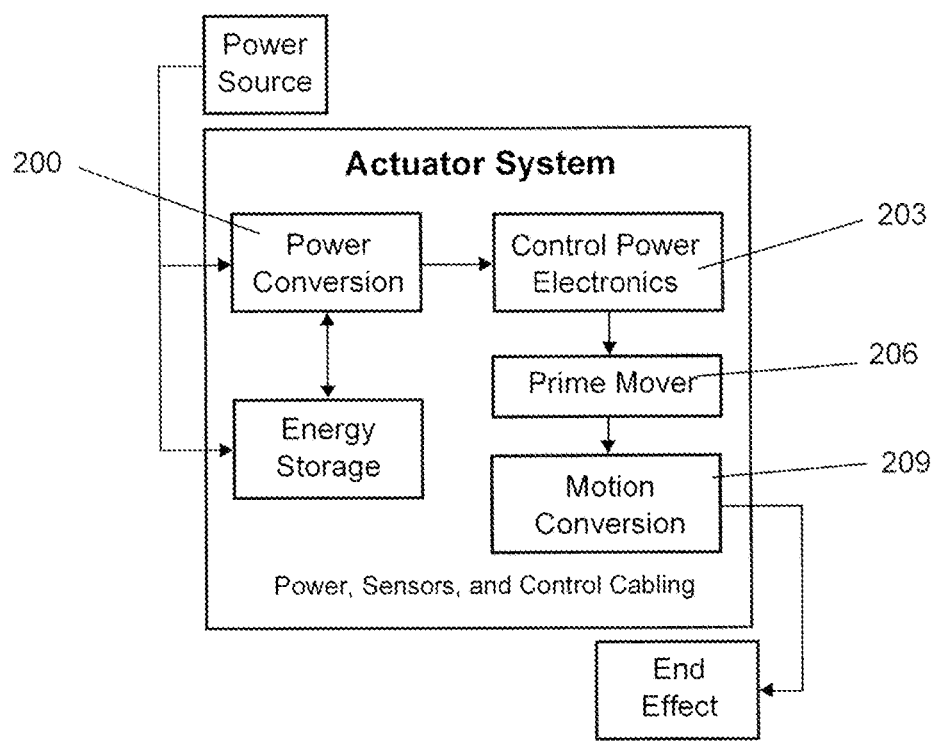
FIG. 1 is an actuator system block diagram.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. The following acronyms are used in this specification and are defined as follows:

A/D Analog to Digital
ADRC Adaptive Disturbance Rejection Control
BLDC Brushless Direct Current
DC Direct Current
DOST Discrete Orthonormal Stockwell Transform
DSP Digital Signal Processing
EMA Electromechanical Actuator
EMF Electromagnetic Field
FIR Finite Impulse Response
FFT Fast Fourier Transform
FPGA Field Programmable Gate Array
FRF Frequency Response Function
FXLMS Filtered-X Least Mean Square
IC Integrated Circuit
IGBT Insulated Gate Bipolar Transistor
LMS Least Mean Square
MRAIC Model Reference Adaptive Inverse Control
PWM Pulse Width Modulation
R&D Research and Development
RPM Revolutions Per Minute
S&T Science and Technology
SiL Software-in-the-loop
STFT Short Time Fourier Transform As shown in FIG. 1, electrical actuator systems can often be described in terms of the five basic elements: power conversion 200; control power electronics 203; an electric motor as the prime mover 206; mechanical components such as gears, screws and bearings for motion conversion 209; and sensors. Each of these elements may contribute to the vibration signature of the actuation system. Each of these actuator system elements can be examined in detail to identify the vibration sources.

Figure 2:
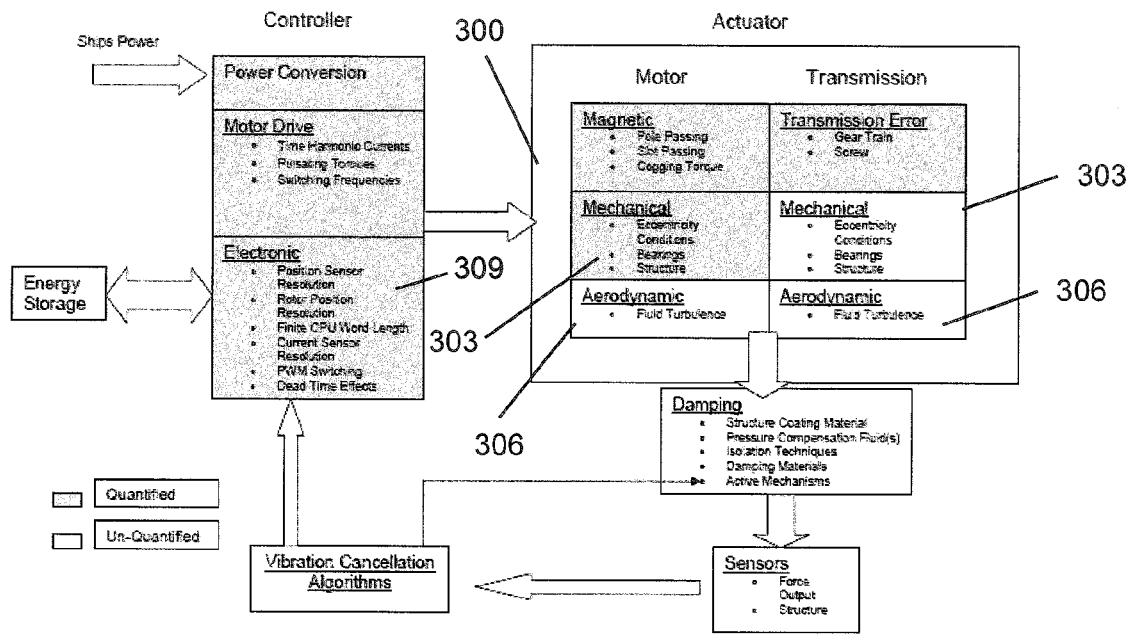
FIG. 2 is an actuation system block diagram.

The block diagram in FIG. 2 displays potential sources of vibration. These sources of noise in an electromechanical actuator include magnetic 300, mechanical 303, aerodynamic 306 and electronic noise 309. For magnetic noise 300, the objective was to reduce the amount of cogging torque. In the described embodiments, design elements were created and method steps were developed to mitigate these sources of noise and ultimately produce a virtually noise free actuator system. In addressing the mechanical noise 303, additional sensors were added to reduce vibration in the mechanical structure. For electronic noise 309 an output filter design and current controller modifications were made to reduce noise associated with pulse width modulation (PWM) switching devices used to drive the motor.

One aspect of the invention provides a combination of active vibration control and passive output electrical filtering noise mitigation measures in a two pronged approach to reducing the production and transmission of vibration and noise associated with brushless DC motors.

Very high frequency vibration/noise, related to IGBT bridge switching (>20 kHz), is suppressed via a passive electrical output filter on the BLDC drive output. Current control bandwidth, robustness, and accuracy is maintained through the optimization of current control algorithms and current measurement instrumentation.

Vibration and noise in the low to mid frequency region is primarily due to motor torque ripple, cogging, and drive commutation errors. These effects are actively mitigated via adaptive torque ripple cancellation control algorithms. At frequencies where residual vibration is amplified by lightly damped structural resonance, active damping is employed to reduce vibration transmission.

These two efforts are nearly decoupled; however the active vibration control algorithms rely on the ability to accurately control a desired current waveform in the motor windings up to the highest frequency of interest. The highest frequency of interest is determined by the highest torque ripple harmonic one wishes to cancel, and the highest RPM at which the motor will be operated. So it is critical that any measures taken to mitigate IGBT switching noise do not significantly compromise the linearity, bandwidth or signal-to-noise performance of the drive's current control loops.

Torque ripple is the principal disturbance in the low to mid frequency range which is mitigated with adaptive cancellation control. Torque ripple can be thought of as an additive "torque noise" which rides on top of the nominal net motor torque. This disturbance is subsequently propagated to the load via the drive train, and to the host structure via the motor housing mounting interface. Vibration associated with torque ripple may also be amplified at certain frequencies due to structural resonance in these load paths.

For this application "torque ripple" is defined as a disturbance added to the net motor torque which is periodic with motor shaft position when a constant torque (quadrature current, $i_q$) command is given to the drive. This definition lumps together several underlying causes of torque ripple.

The brushless DC motor drive is the culprit for a subset of the torque ripple seen at the motor output. The drive may be considered as the cause of torque ripple when (for any reason) it delivers other than the ideal sinusoidally commutated phase currents to the motor. Specific drive imperfections include errors in motor-shaft position sensing (affecting commutation errors), current measurement errors (offset and scaling), and current control errors (output current failing to follow commanded profile).

While a great deal of effort is made to optimize the motor design, there are always some residual imperfections that result in torque ripple; even if the drive delivered perfect phase current waveforms. The non-ideal effects include the following. Ideally a sinusoidally commutated motor has been designed with a winding distribution that results in each motor phase having a sinusoidal back-EMF waveform. In practice it is impossible to make this perfect, and any deviation results in torque ripple which is dependent on the RMS motor current and periodic with angular shaft position. Due to the pattern of magnet poles and winding slots, the reluctance of the motor's magnetic circuit is a function of the motor shaft angle. The shaft is naturally attracted to the low-energy states at the angles corresponding to minimum reluctance. This causes a torque disturbance that is periodic with angular shaft position. It is nominally independent of motor current (although changes in cogging can be affected at high current levels due to saturation effects). Changes in the magnetic flux orientation and magnitude associated with motor velocity induce a torque opposing that velocity (analogous to viscous and friction damping). These losses have an unsteady component that is periodic with motor shaft position which contributes to torque ripple.

Random perturbations to the nominal motor torque (due to propagation of current sensor noise, for example) which have no relationship with motor shaft position are not included in what we consider torque ripple, and they are not addressed by the adaptive cancellation algorithms of one aspect of the invention. While active damping will reduce the response to random disturbances to some degree, we still rely on sensor performance, well designed grounding, shielding, and signal conditioning to mitigate noise issues which are completely random in nature.

Figure 3:
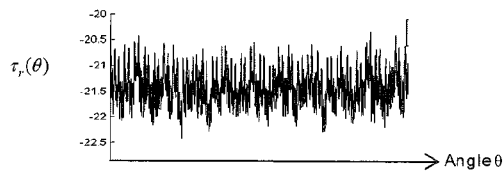
FIG. 3 is a pair of graphs showing torque ripple plotted versus shaft angle and angular wavenumber.
Figure 3:
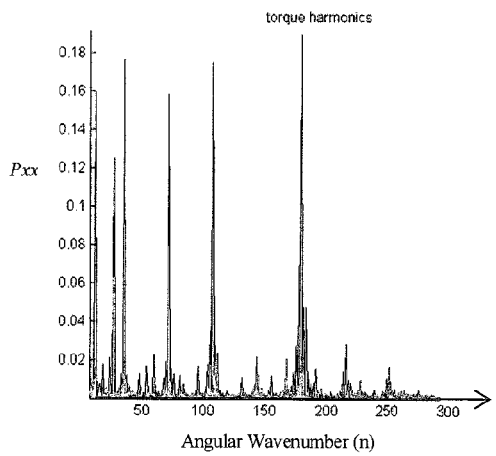

One common feature of all the phenomena which contribute to torque ripple is that they are periodic with motor shaft position for a steady operating condition (current amplitude, speed etc.). So if one considers a steady state operating condition, then the torque ripple waveform could be well approximated by a finite set of harmonics. This idea is illustrated in FIG. 3 which plots torque ripple versus motor shaft position.

Even though the torque ripple is periodic with motor shaft position for a specific operating condition; the magnitude and phase of the torque ripple harmonics are very sensitive to the motor operating condition. Drive imperfections (especially current measurement offset and scaling errors) are especially sensitive to temperature. Motor imperfections are sensitive to motor current amplitude and velocity. Since the magnitude and phase of the torque ripple harmonics are dependent on many variables, the torque ripple is not a simple repeatable periodic disturbance, which makes the torque ripple cancellation problem more difficult since it cannot be cancelled using a deterministic, predictive lookup table. This is why adaptive control algorithms are used to effectively cancel this type of disturbance.

The algorithms developed for torque ripple cancellation are described herein. Characterization of the torque ripple on the present system is described herein.

Figure 4:
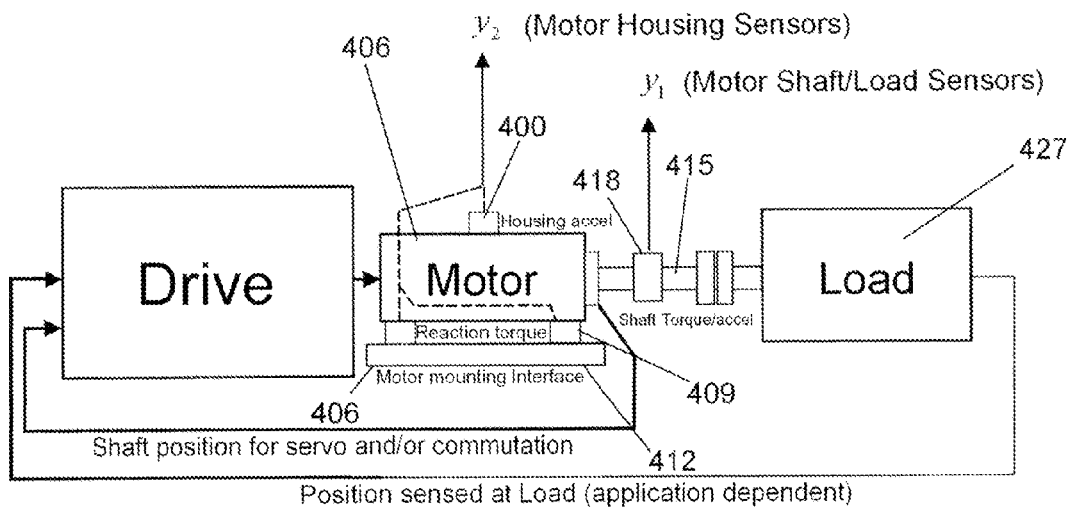
FIG. 4 is a simplified block diagram of drive, motor, and load.

A simplified block diagram of a typical brushless DC actuator is shown below in FIG. 4. Instrumentation which is specific to one aspect of the present invention has been added and includes an accelerometer 400 mounted on the motor housing 403. Load cells 406 and 409 measure the reaction force on the motor mounting interface 412. An accelerometer 415 may be mounted on the shaft 418.

This physical system constitutes two fairly decoupled dynamic systems. The side consisting of the motor rotor, output shaft 418, and driven load 421, and the side consisting of the motor stator, housing 403, and mounting interface 412. These two systems are effectively decoupled by the motor shaft bearing and the high bandwidth current loop of the drive. Both systems are excited by the induced torque, including undesired torque ripple. This means it is possible to excite and measure a torque ripple response on either the load or the motor housing side.

Figure 5:
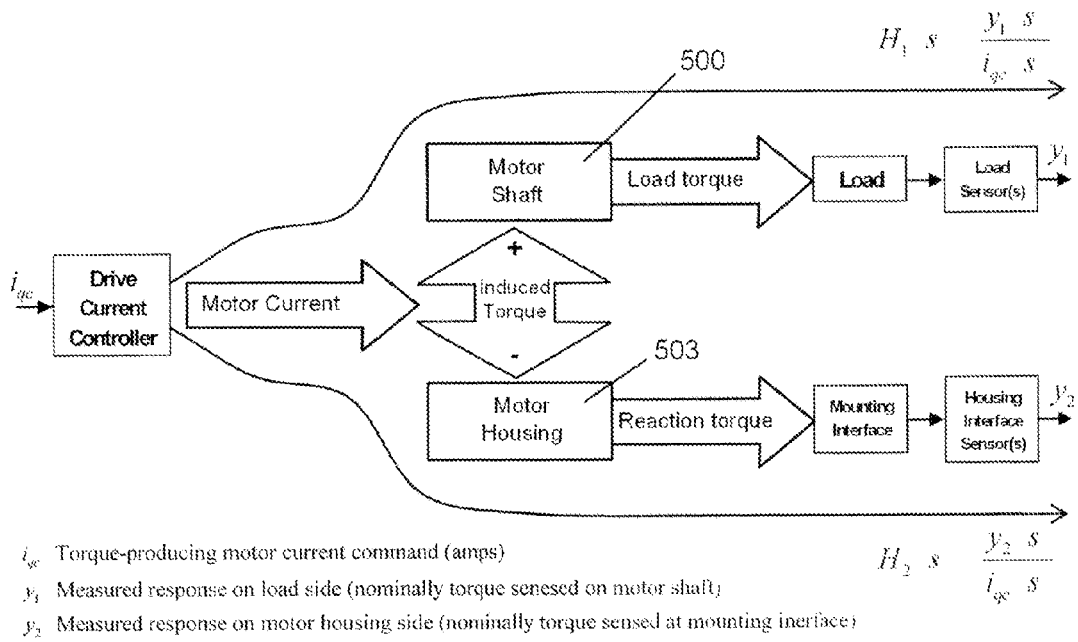
FIG. 5 is a load path diagram.

Turning to FIG. 5, a load path diagram of the drive, motor, load, and sensors is shown. Iqc is the torque producing motor current command. Y1 is the measured response on the load side sensed on the shaft 500. Y2 is the measured response on the motor housing 503 side. Torque may be sensed by a load cell at the mounting interface.

In many applications the load characteristics may be non-linear and vary with time or system state. For example hard-stops, variable friction, static friction and backlash may be present, making the load path dynamics indicated by $H_1(s)$ non-linear and/or time-variant. The adaptive disturbance rejection control algorithms will work best if the dynamics relating to motor torque and the measured response are linear and time invariant. Therefore, the preferred means of measuring the torque ripple response is via $H_2(s)$, since an actuation system can generally be designed such that $H_2(s)$ is linear and time-invariant.

This invention focuses on vibration control via the $H_2(s)$ load path, since this is an integral part of the primary vibration control approach, especially for naval applications that require minimum structure borne noise propagation. However, active damping may also be applied to the $H_1(s)$ load path if deemed necessary for a given application. Active damping of the $H_1(s)$ load path will not be addressed in detail herein; however its implementation would be analogous to that for the $H_2(s)$ load path, which we cover here in detail.

The control strategy for one aspect of the present invention can roughly be described as three cascaded controllers. An active damping controller is the inner-most loop. The purpose of this classical feedback controller is to add damping to any lightly damped structural resonance that may exist in the load path relating the motor current command and the sensor(s) (labeled as $H_2(s)$ in FIG. 5) used to measure the torque ripple vibration response. The middle stage of the cascade structure is an adaptive controller which runs in the time domain. This adaptive controller seeks to flatten the amplitude response of the $H_2(s)$ and make the phase a linear function of frequency. The modified $H_2(s)$ approximates a pure delay within a frequency range of interest. The third and final layer in the cascade is the adaptive disturbance rejection controller. This controller runs in the motor shaft angle domain. The ADRC generates a compensating current command $i_c$ which compensates for the torque ripple disturbance $\tau_r$, and (ideally) yields a net motor torque $\tau_{nominal}$ that is proportional to the nominal torque-producing current $i_q$.

Figure 6:
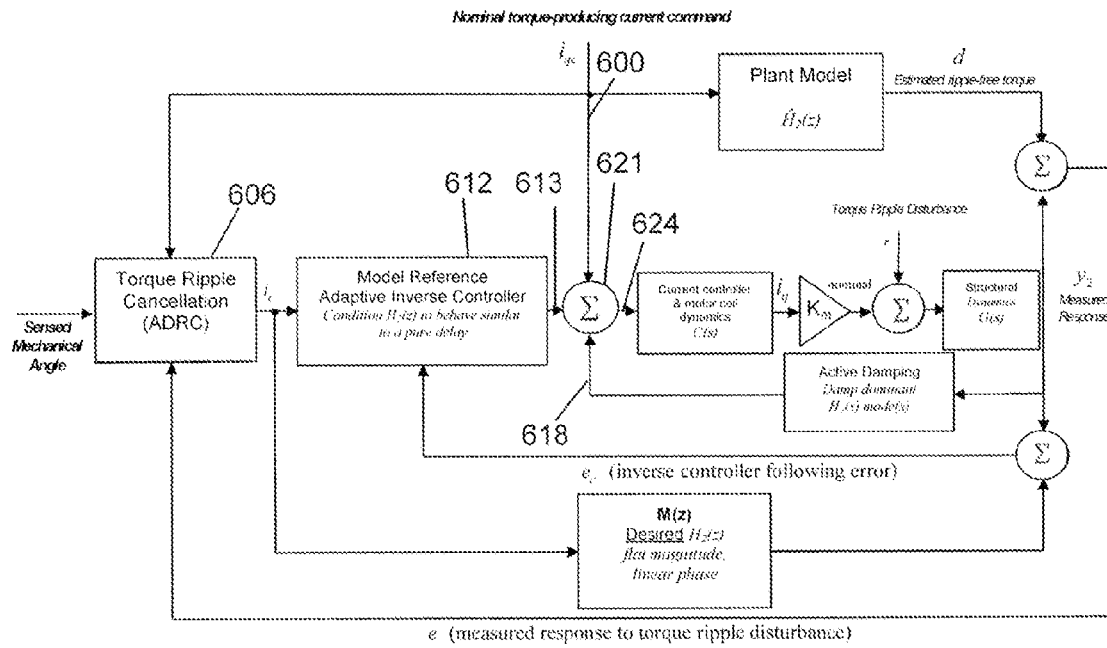
FIG. 6 is a block diagram of the control structure of one aspect of the invention.

FIG. 6 shows an overall block diagram that summarizes the cascaded control structure of active damping 615, MRAIC 612 and ADRC 606. The torque ripple is represented as an additive disturbance summed together with the nominal torque produced by the motor, just prior to the structural dynamics of the actuator mechanical assembly. The output of the secondary path transfer function is $H_2(s)$ and the reaction torque sensed at the motor housing is labeled as y2 in FIG. 6.

The active damping controller 615 serves two purposes. First, by adding damping to the dominant structural resonance(s) in the load path H2(s), it reduces the transmission of any residual torque ripple generated by the drive/motor system. Second, by mitigating the sharp magnitude peaks and phase transitions, it reduces the sensitivity of the adaptive controllers to model-mismatch errors. This is allows the overall system to be robust to expected non-linearity and uncertainty of plant dynamics.

The Model Reference Adaptive Inverse Controller 612 (MRAIC) runs in the time domain and operates on H2(s) which is nominally independent of the load characteristics, motor shaft position, and the motor RPM. The MRAIC is a convenient means of simplifying the plant dynamics, so that H2(s) can be approximated as a pure delay by the (outermost) adaptive disturbance rejection controller 606.

The Adaptive Disturbance Rejection Controller 606 (ADRC) adds a compensating current command 613 $i_c$ to the nominal torque-producing current command 600 $i_{qc}$. There are multiple command interfaces for compensating current command and multiple approaches/algorithms for computing the compensating current command which will cancel the torque ripple.

Ideally the ADRC compensating current command 613 cancels the effect of the torque ripple disturbance $\tau r$, and results in a net motor torque equal to $\tau$nominal. The underlying causes of torque ripple within the drive and the motor are such that the optimal compensating current command is a function of the motor shaft angle ($\theta$), but the specific waveform depends on temperature, current (torque) amplitude, and drive speed. This is why adaptive control algorithms have been used for this application, rather than predictive control based on a deterministic lookup-table.

The ADRC 606 is fundamentally different from the inner two layers (active damping 615 and MRAIC 612) in that it operates in the motor shaft angle domain. This is the most natural domain for torque ripple cancellation, because the torque ripple is by nature a function of motor shaft position (among other things). In summary, the ADRC 606 algorithms for one aspect of the invention measure reaction torque at the motor-mount interface (y2), and from this measurement, determine a compensating current command 613 that is a function of the motor shaft angle ($\theta$), which will reduce the measured response. The ADRC 606 algorithm does this iteratively in small steps (a "gradient descent" approach), until it converges to an optimum solution, where all the torque disturbances which are a periodic function of motor shaft angle are cancelled. To ensure that this approach converges, the controller has to (at least roughly) anticipate the frequency response of the so-called "secondary path" dynamics (which we refer to in this document as H2(s)). Recall that the H2(s) dynamics are what relate motor current commands to the measured response y2. This includes the dynamic response of the current control loop, and mechanical resonance due to the motor housing inertia and the finite stiffness of the load-cells and mounting interface structure.

It would be computationally expensive to implement a bank of filters for a large number of target harmonics if the secondary path dynamics had to be approximated by a filter H2(z) operating in the time domain. Such a filter would have to be duplicated k times for k target harmonics. By "pre-compensating" the plant with the MRAIC 612, we can consider the secondary path dynamics from the viewpoint of the ADRC 606 as an angle phase shift that is proportional to the motor RPM. Applying the phase shift to the torque ripple command bases (sinusoids driven by multiples of the motor shaft angle) is computationally simple.

The torque ripple cancellation technology developed for one aspect of the invention requires additional sensors to be integrated with the motor, and made available to the drive where adaptive algorithms compute a compensating current command to reduce vibration. The methodology behind choosing sensor types and sensor placement is discussed herein. The compensating current command is added to the current commands which result from the actions of the servo loop (i.e. torque required for the actuation task at hand) The compensating current command cancels torque ripple disturbances and actively damps mechanical resonance so as to smooth the torque response of the motor and thereby reduce the transmission of vibration via the load and motor housing. The additional components required for this approach consist of the sensors which monitor the motor reaction torque and their related signal conditioning and A/D channels in the DC Brushless drive. Furthermore, additional processing capacity is required in the drive FPGA for the associated control algorithms. No auxiliary disturbance-cancellation actuators (such as reaction mass actuators) are incorporated because the system is focused on modifications of the drive algorithms (and additional sensors as needed), in order to mitigate vibration/noise that is either directly caused by or responsive to motor torque.

Figure 7:
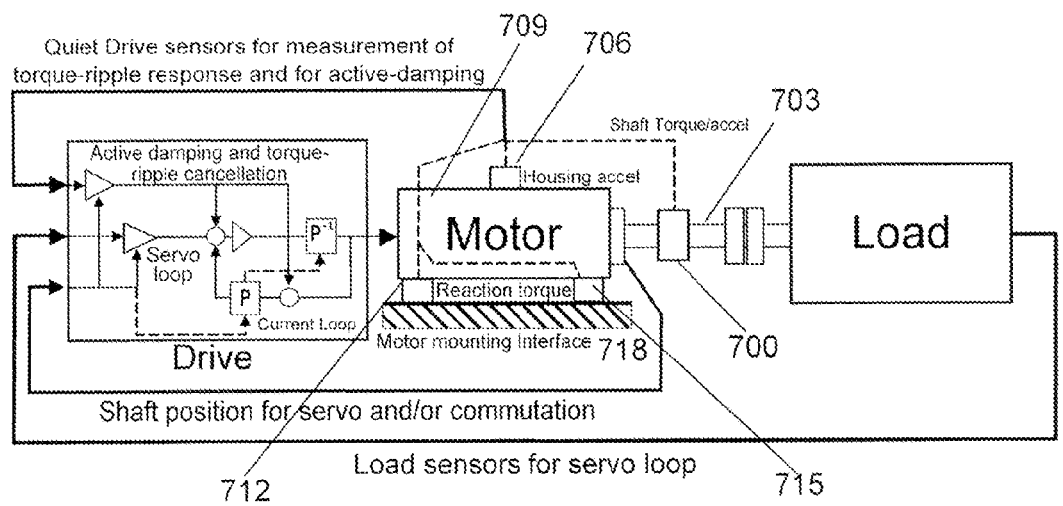
FIG. 7 is a block diagram of one aspect of the invention.

Although a variety of sensor types such as accelerometer 700 on the shaft 703, accelerometer 706 on the motor housing 709 or load cells 712, 715 on motor housing interface 718, may be used as shown in FIG. 7, all of the detailed simulation and test results for adaptive torque ripple cancellation required only measured reaction torque at the motor housing interface.

The overall sources of noise in an EMA include magnetic, mechanical, aerodynamic and electronic noise. For magnetic noise, the overall objective was to reduce the amount of cogging torque. For mechanical noise, additional sensors were added to reduce vibration in the mechanical structure. For electronic noise, an output filter design and current controller modifications were aimed at reducing noise associated with pulse width modulation (PWM) switching devices used to drive the motor.

All of the adaptive algorithms developed for one aspect of the invention are based on the LMS algorithm and its variants.

The overall control strategy for one aspect of the invention is a cascade of three fundamentally different types of control. An active damping controller is the inner-most loop of the cascade architecture. This feedback controller pre-conditions the plant for the next cascaded control stage (MRAIC). The middle stage in the cascade is an adaptive inverse controller which runs in the time domain. The purpose of the MRAIC controller is to pre-condition the plant dynamics as seen by the third and final stage of control. The third and outer-most stage in the cascade is the adaptive disturbance rejection controller. This controller runs in the motor shaft angle domain. The ADRC generates a compensating current command which compensates for the torque ripple disturbance $\tau_r$, and (ideally) yields a net motor torque $\tau_{nominal}$ that is proportional to the nominal torque-producing current command $i_{qc}$.

Referring back to FIG. 6, the block diagram presents this overall control architecture. Multiple ADRC algorithms have different strengths and tradeoffs with respect to performance and complexity.

Figure 8:
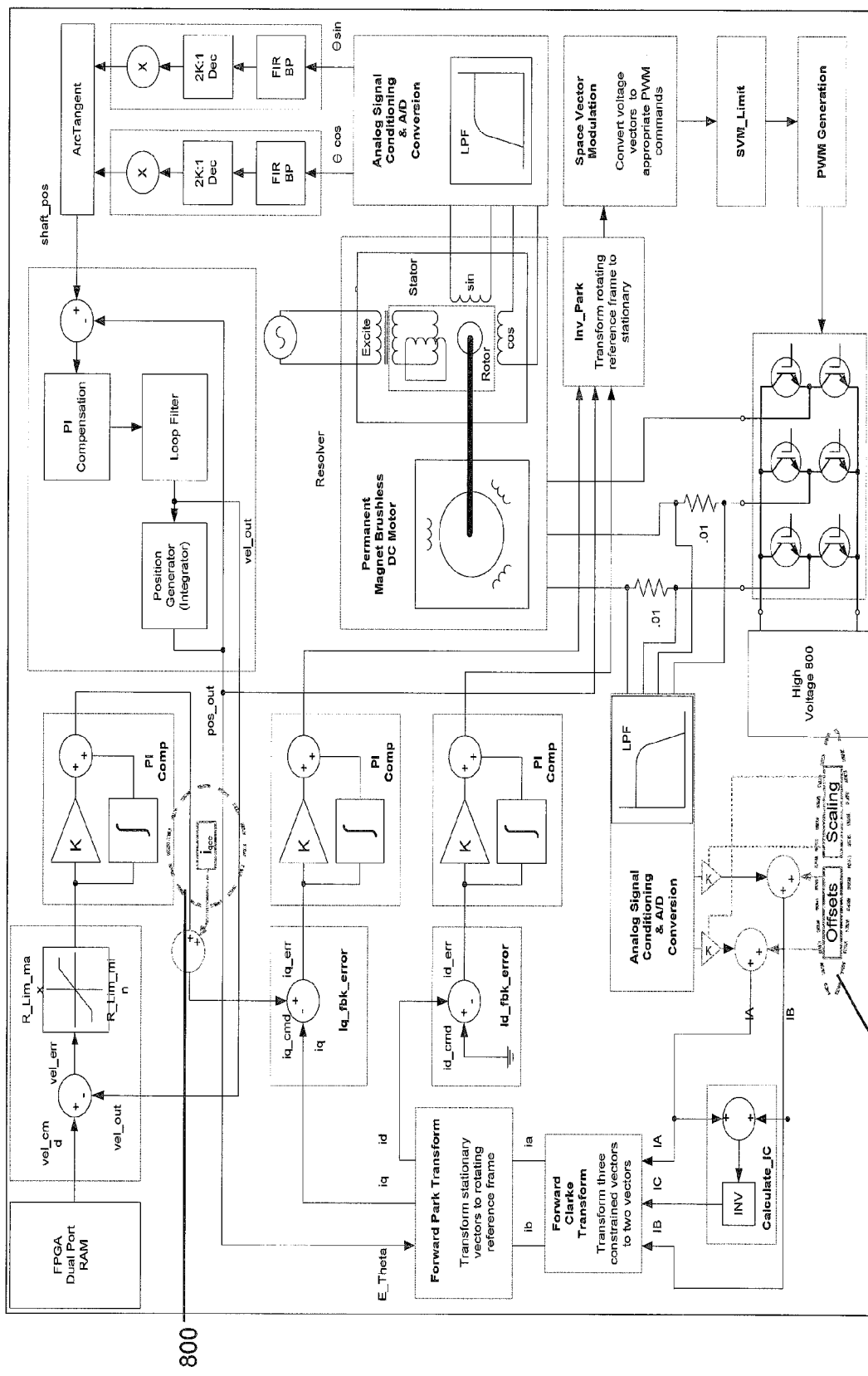
FIG. 8 is a block diagram of one aspect of the drive motor control subsystem.

All of the vibration control algorithms affect the motor torque output via the current control loop of the drive. There are two different command interfaces by which the controller affects a compensated motor current. The command interfaces are a summing junction with the torque-producing command $i_{qc}$ which accepts a torque ripple compensating current command $i_c$, and an explicit adjustment of current-measurement scaling and offset parameters These interfaces are indicated by arrows 800 and 803 in the drive electronics block diagram of FIG. 8. The most general control interface is to define a compensating command ic which is added to the commanded quadrature (torque-producing) current iqc, thus proportionally affecting a direct adjustment of the net torque output of the motor (independent of motor shaft position). The actual quadrature current iq is estimated from the three phase current measurements and the motor shaft position measurement via the Clarke transform. iq is defined in a rotating reference frame and the net torque produced by the motor is (nominally) proportional to iq, independent of the motor shaft position. This is a convenient interface for active damping control and for commanding torque ripple-cancelling current when it is desired to have a compensating command to directly influence net motor torque. This interface is used for active damping control, model reference adaptive inverse control, and for torque ripple cancellation with the exception of torque ripple harmonics that are due to current-measurement errors in the drive.

The 1N and 2N harmonics (where N is the number of motor pole pairs) are a special case since they can be shown to be directly related to current measurement errors (offset and scaling errors, respectively). Current measurement scaling errors actually produce higher harmonics as well, and their effect on torque ripple is modulated by the magnitude of the commanded quadrature current iq. Due to this non-linear aspect of scaling errors, it is more effective to structure the compensation of current measurement errors such that the scaling and offset errors are estimated from the amplitude and phase of the 1N and 2N harmonics and then compensated by making explicit corrections to the measured phase currents. This is important for continuous adaptation methods, since it is desired to have a constant current measurement error to be well compensated by a constant controller parameter which can be converged upon easily by a gradient descent method. So the interface for continuous adaptation of the 1N and 2N harmonics is located just after the current-measurement acquisition stage, where the estimated offset and scaling errors are explicitly compensated. The special case of estimation and correction of current measurement errors is discussed in more detail herein.

Figure 9:
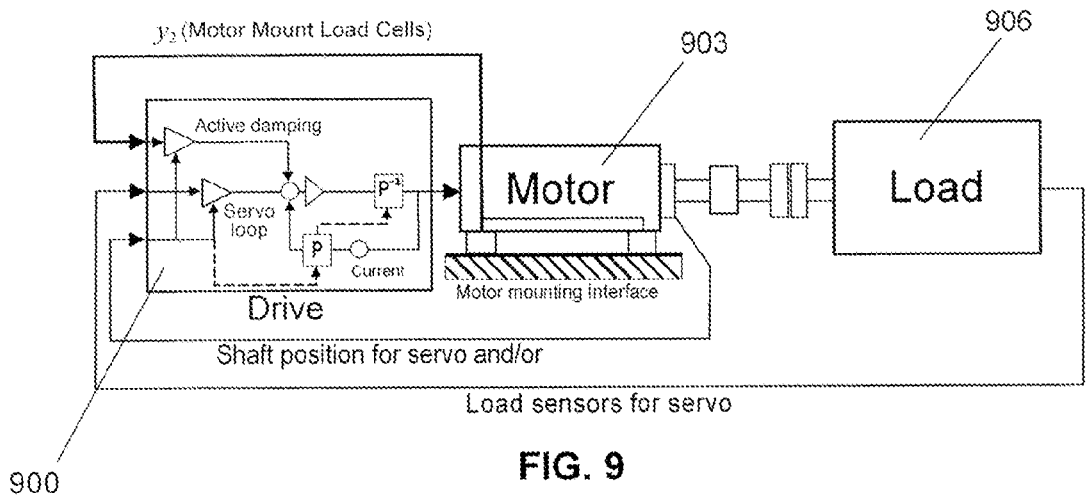
FIG. 9 is a block diagram of the active damping control system components.

A simple block diagram representation of the drive 900, motor 903 and load 906 is shown in FIG. 9. Torque ripple is represented as additive noise just prior to the structural dynamics block. It is common to have lightly damped mechanical resonance associated with the drive train, load and the motor mounting interface. These modes amplify motor vibrations and complicate the application of adaptive vibration control.

A low-authority feedback controller can be configured in the feedback path, which only affects an increase in damping in a target mode (or modes). Such a control law is generally configured with very generous stability margins (>=90 degrees of phase margin, >=12 dB of gain margin) and is very robust to subtle changes in plant dynamics.

The active damping system components include load cells used to sense reaction torque at the motor housing interface (motor housing reaction torque corresponding to the variable y2 in the control system block diagrams). The measured motor housing reaction torque is employed in a feedback loop via drive's compensating current command interface ic, resulting in a damping effect on two dominant torsion modes of the motor housing on its mounting brackets and load cells.

Measured open and closed loop Bode plots taken from the active damping control loop implementation are discussed herein.

Figure 10:
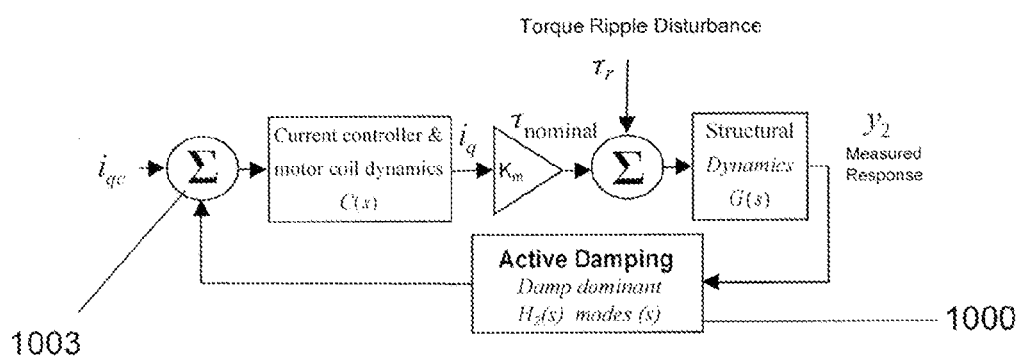
FIG. 10 is a block diagram of the active damping system.
Figure 10:
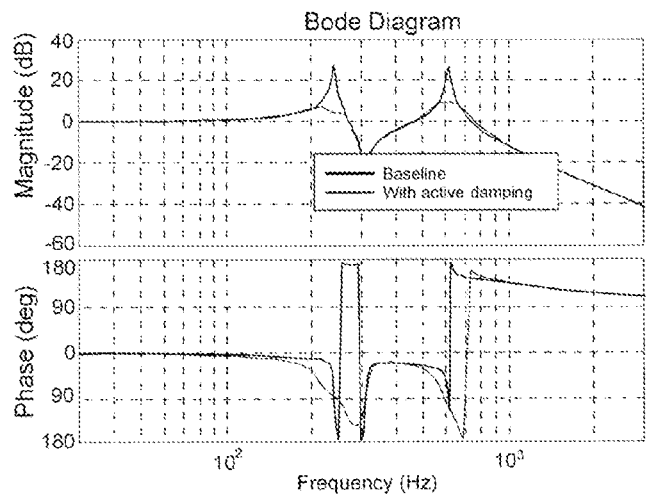

A block diagram of the active damping control system is shown in FIG. 10. The active damping control system blocks are indicated by arrows 1000 and 1003.

Figure 46:
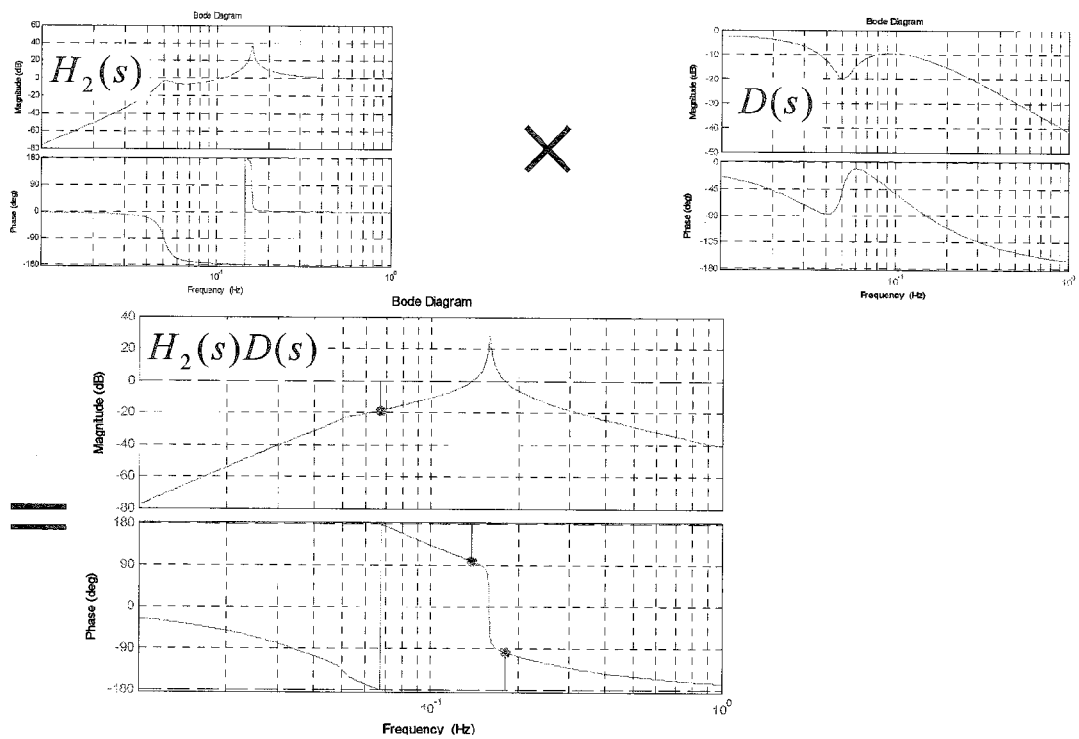
FIG. 46 is a series of bode diagrams.

Let $H_2(s)=C(s)G(s)$ (Relating $i_{qc}$ input to output measurement $y_2$) and the Active Damping controller block is referred to as LTI filter D(s). The active damping controller block D(s) is then designed to yield a desired open-loop FRF $H_2(s)D(s)$ as shown in FIG. 46.

Figure 47:
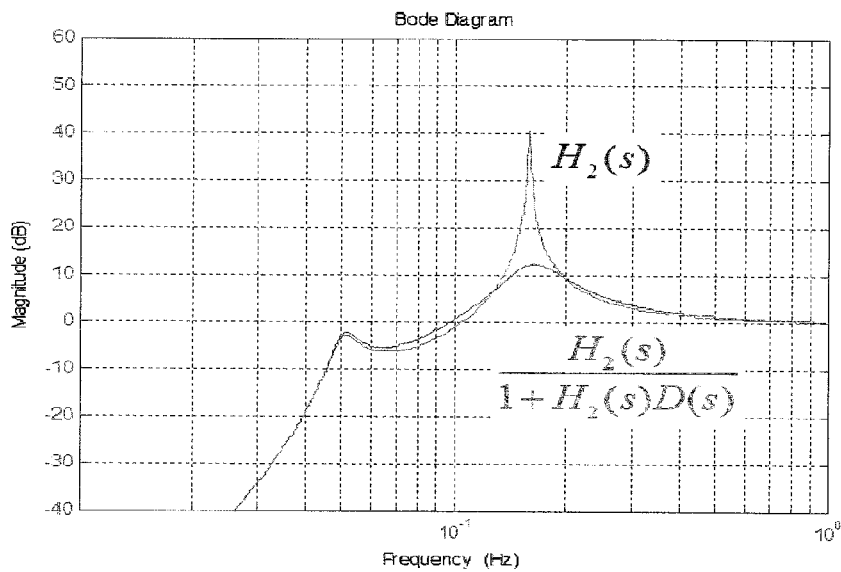
FIG. 47 is a bode diagram.

The design procedure involves shaping $H_2(s)D(s)$ so as to maximize the loop gain at the target mode frequency and yield generous and balanced stability margins in the open-loop FRF $H_2(s)D(s)$. H2(s) is modified by the active damping controller D(s) placed in the feedback path. As a result, the resonant peaks are suppressed, and the phase transitions more gradual as shown in FIG. 47.

As illustrated in the graphs shown in FIG. 10, the active damping system knocks down the sharp resonant peaks of the targeted modes and yields much more gradual phase transitions through the resonant frequencies of the two target modes.

Active damping is beneficial when very lightly damped structural dynamics feature prominently in the frequency response of a plant to be controlled. In the case of one aspect of the invention, there are two load paths of interest: $H_1(s)$ and $H_2(s)$, as described in the previous section. The focus is on $H_2(s)$ which is relevant to adaptive torque ripple cancellation, however note that lightly damped resonance in either of these load paths will tend to amplify residual torque ripple (there will be some residual, even with the successful application of adaptive cancellation). Therefore in some applications there will be some benefit to applying active damping control to both of these load paths.

The frequency response of the load path $H_2(s)$ (the motor housing side) which we utilize for measurement of torque ripple response needs to be accounted for within the ADRC algorithms. It is therefore important for this frequency response to be as linear and time-invariant as possible in order to make the ADRC problem more tractable. Even if the motor housing load path dynamics can be well approximated by a linear and time-invariant model $H_2(s)$, lightly damped resonance (with its associated sharp peaks and phase transitions) will make the system very sensitive to small discrepancies between the resonant frequencies in secondary path filter $H_2(s)$ and those in the real plant. An active damping control system can serve to "pre-condition" the plant, reducing the sensitivity to modeling error, so that adaptive control can be applied with less difficulty.

Another step toward paving the way for ADRC, is to further modify the secondary load path $H_2(s)$ "seen" by the ADRC so that it can be well approximated by a pure delay within the frequency range of interest. This type of control does not require high precision, but seeks to produce a "friendlier" frequency response having a smooth (reasonably flat) amplitude response and a linear phase response.

Figure 11:
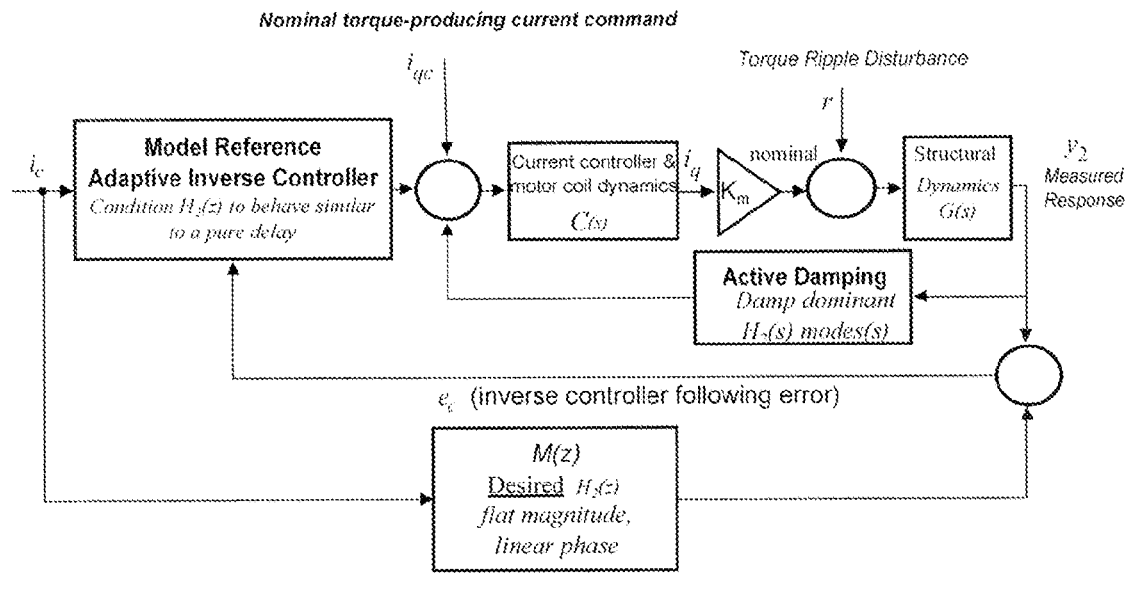
FIG. 11 is a MRAIC control block diagram.
Figure 11:
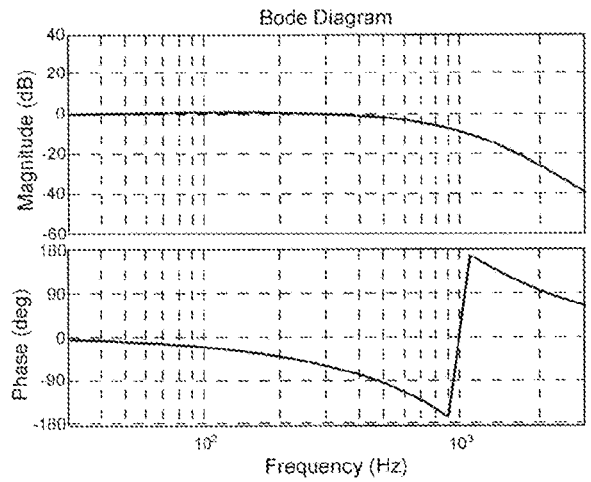

The MRAIC control subsystem is shown in FIG. 11, combined in cascade with the active damping controller. The MRAIC subsystem blocks are indicated by arrows 1100 and 1103.

MRAIC control paves the way for ADRC control. The model reference adaptive inverse controller runs in the time domain, without regard for the motor RPM or shaft angle. Its job is to compensate for the dynamics relating the commanded motor current to the sensor outputs which measure the reaction torque against the motor mounting interface. This allows the adaptive disturbance rejection controller to treat the (modified) secondary path dynamics as a time-delay, thus drastically simplifying the computations required in that (angular domain) algorithm.

Because we expect that the secondary path dynamics can be well approximated by the linear, time-invariant transfer function H2(s) (independent of load or RPM), and because the ADRC controller can tolerate a somewhat de-tuned MRAIC, our preferred strategy is to identify the plant off-line (during planned installation or maintenance when it is acceptable to induce small levels of vibration), and utilize the inverse controller without any online adaptation. This is chiefly because online adaptation requires persistent excitation which implies noise generation.

The typical off-line adaptation procedure would be an approximately 30 second operation, during which the motor would be excited with low-level band-limited random noise ic, so that a transfer function H2(s) can be estimated relating the random command ic to the torque ripple response measurement y2. A causal FIR filter-based inverse controller M(z) can be derived directly from this FRF measurement. The reference model will be configured as a low-pass function with a flat amplitude response throughout the frequency range of interest for torque ripple cancellation, and a pure delay sufficiently long to guarantee that a causal controller B(z) can be obtained such that B(z)H2(z) approximates the desired response M(z).

The operations concept for this MRAIC subsystem is that the off-line adaptation would be performed during the initial installation and checkout of the actuator. Subsequent off-line adaptations would only be required on schedule maintenance intervals. The frequency of these maintenance intervals in terms of hours of operation is not yet determined. Re-adaptation of the MRAIC would also be required in the case of hardware swap outs, or if an anomaly is detected, such as an unexpected trend in the converged controller parameters for the adaptive disturbance rejection controller or increased residual noise/vibration.

Figure 12:
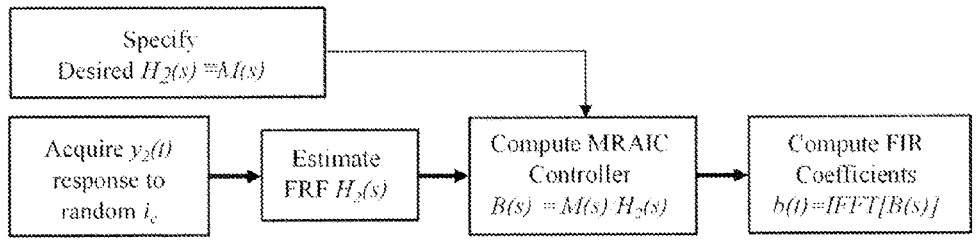
FIG. 12 is a flowchart of a frequency-domain batch process.

In our hardware test bed implementation the MRAIC controller was synthesized using a frequency-domain batch process as described in FIG. 12 which yields an FIR filter realization for the reference model M(s). This approach is very straightforward and can be easily automated. The key design task is specifying the reference model M(s) with sufficient delay (slope of linear phase) such that B(s) is causal. The causality of B(s) is easily accessed by inspection of the impulse response b(t).

The ultimate goal is to provide quiet actuation with brushless DC motors. Cogging and torque ripple are the disturbances the system seeks to mitigate (in terms of noise produced by the motor itself) in the low to mid frequency range.

The Adaptive Disturbance Rejection Controller (ADRC) adds a compensating current command $i_c$ to the nominal torque-producing current command $i_{qc}$. There are multiple command interfaces for compensating current command and multiple approaches/algorithms for computing the compensating current command which will cancel the torque ripple.

Figure 13:
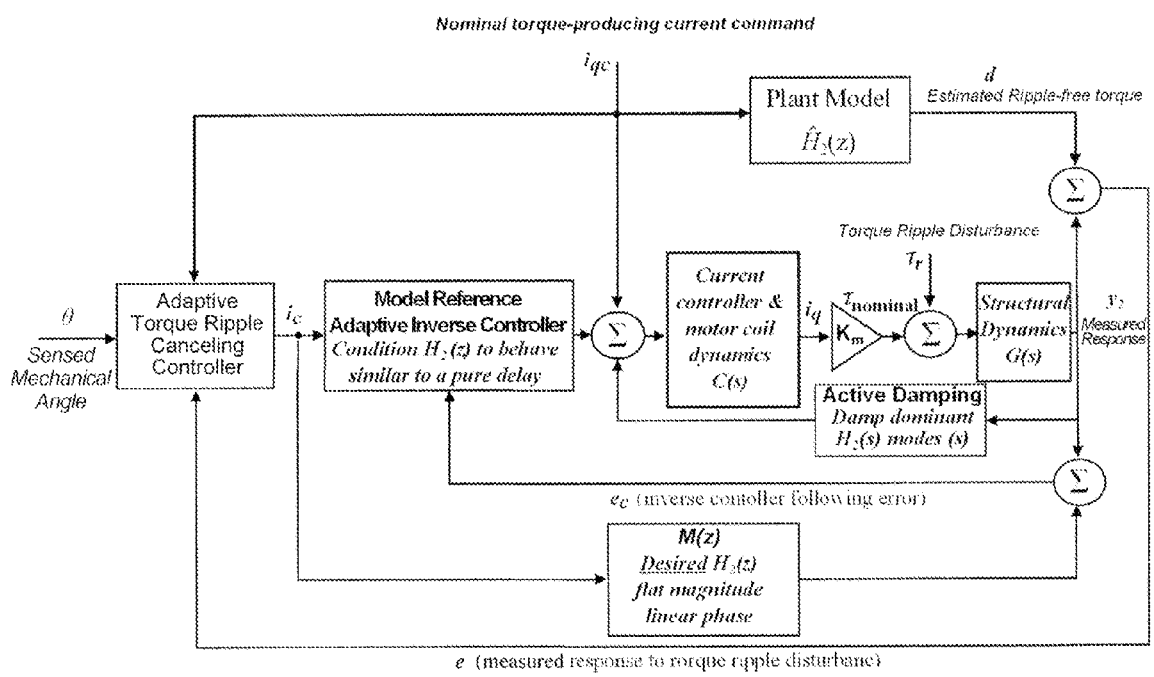
FIG. 13 is a block diagram for the ADRC and related Plant Model.

The completed control system block diagram is shown in FIG. 13. The ADRC components are indicated by arrows 1300 and 1303.

The following is a list of requirements for designing control algorithms for torque ripple cancellation. The torque ripple cancelling controller should compute a compensating current command such that this command, summed together with the nominal torque-producing current command ($i_{qc}$) will result in a significant reduction (goal of 20 dB) in torque ripple measured at the motor housing. Compensation commands should be delivered to the drive's current loop in terms of torque-producing current ($i_q$), and/or via adjustments to the assumed scaling and offsets in the drive's current-sensing subsystems. Controller parameters should be periodically optimized to account for changes in the motor, drive and load such that performance is maintained during normal operation of the servo drive. Algorithms should be parametric and applicable to any brushless DC actuation system (requiring only parametric changes to accommodate various motor pole counts, size/power, RPM ranges, sensor specifications, etc.). It must be possible to de-activate the adaptive torque ripple compensation features without compromising the baseline (uncompensated) drive/motor performance (graceful failure).

Some initial tests were aimed at assessing the usefulness of a very simple static lookup table for torque ripple compensation. It became obvious early on that the dominant torque ripple components were due to current-measurement offset and scaling errors, which are in turn sensitive to the temperature of the current-sensing components in the drive, and therefore always exhibiting some level of variation; making the use of static lookup tables alone ineffective. Furthermore, early motor/drive characterization testing revealed that the numerous torque ripple harmonics were very sensitive to motor operating condition (current amplitude in particular) and that many harmonics exhibited unique and non-linear dependence on these variables.

Therefore it was decided to pursue adaptive algorithms which can continuously track changes in the torque ripple characteristics during normal operation of the motor and effectively cancel it by sending compensating current commands via the motor drive current loop.

The underlying physical phenomena that produce torque ripple include motor imperfections such as reluctance torque, non-ideal flux distribution in the gap and hysteresis and eddy-current losses, and drive imperfections such as systematic commutation errors and current measurement errors. All these effects result in torque disturbances which are a periodic function of the motor shaft angle for a particular operating condition. Therefore if we restrict our view to a static operating condition (constant current-measurement errors, constant commanded current and motor rpm) then torque ripple can be viewed as a periodic function of motor shaft angle.

If we consider torque ripple as a periodic function of motor shaft angle, then it can be represented in terms of its Fourier series. Torque ripple can then be approximated with a subset of its Fourier series (a finite sum of harmonics). This is efficient from both a computational and data storage standpoint. Fourier methods (specifically the Fast Fourier Transform or FFT) can be used to compute the Fourier coefficients of the torque ripple given a measurement of torque vs. motor shaft angle for one full rotation of the motor shaft.

We have therefore selected Fourier coefficients as the basis functions for torque ripple control. This is efficient and it makes this control approach very scalable, since any number of torque ripple harmonics (in principle) can be targeted, depending on the computational capacity of the embedded controller, the inherent torque ripple performance of the uncompensated drive/motor, and the noise performance requirements of a given application.

Figure 14:
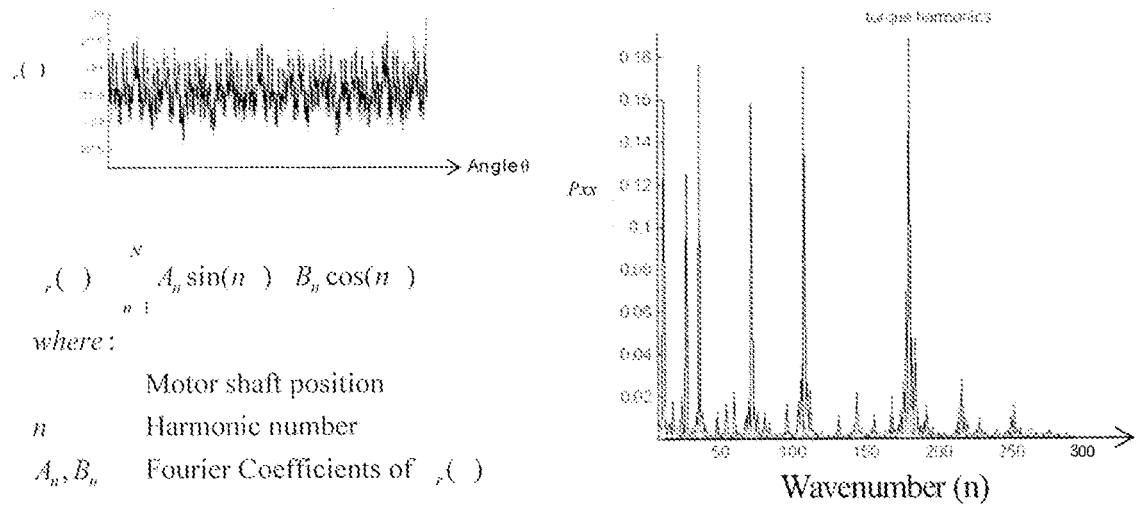
FIG. 14 is a pair of graphs showing torque ripple plotted versus shaft angle and angular wavenumber.

FIG. 14 illustrates this concept, showing an example measured torque ripple time history and spectrum. Note that the horizontal axis on the spectrum is wavenumber as opposed to temporal frequency, and therefore it is independent of motor RPM. Here we define wavenumber as the number of cycles per revolution of the motor shaft.

It should be emphasized here that we are talking about a Fourier transformation from the (motor shaft) angle domain to the wavenumber domain (as opposed to the time and frequency domains).

Ideally the ADRC compensating current command cancels the effect of the torque ripple disturbance $\tau r$, and results in a net motor torque equal to $\tau$nominal. The underlying causes of torque ripple within the drive and the motor are such that the optimal compensating current command is a function of the motor shaft angle, but the waveform also depends on servo drive imperfections, current amplitude, and drive speed. In other words, the torque ripple is only quasi-periodic and is not easily predicted at any given time during normal operation. This is why adaptive control algorithms are used for this application, rather than predictive control based on a deterministic lookup-table.

The ADRC is fundamentally different from the first two stages (active damping and MRAIC) of the overall system controller in that it operates in the motor shaft angle domain. The ADRC algorithms for the system measure reaction torque at the motor-mount interface (y2), and from this measurement, determine the Fourier coefficients of a compensating current (a function of the motor shaft angle), which will reduce the measured response. The ADRC algorithm does this iteratively in small steps, until it converges to an optimum set of control parameters (Fourier coefficients), where all the torque ripple at the targeted wavelengths are cancelled. The adaptation law at the heart of the ADRC algorithm is a variant of the LMS stochastic gradient descent method.

The Filtered-X LMS algorithm (FXLMS) is a technique typically used in adaptive control applications.

Figure 15:
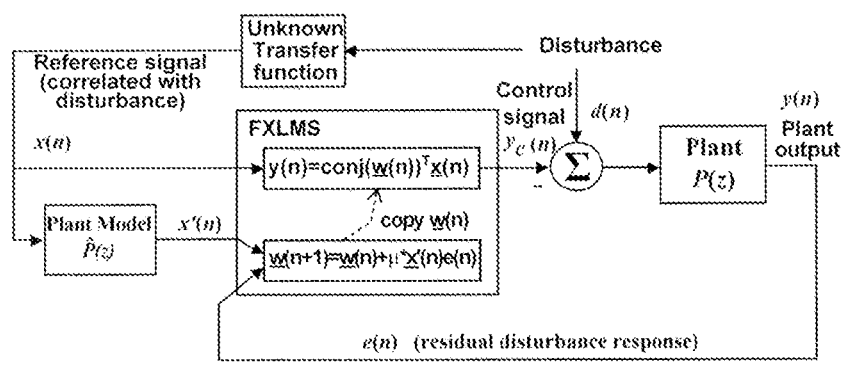
FIG. 15 is a diagram of an FXLMS algorithm.
Figure 16:
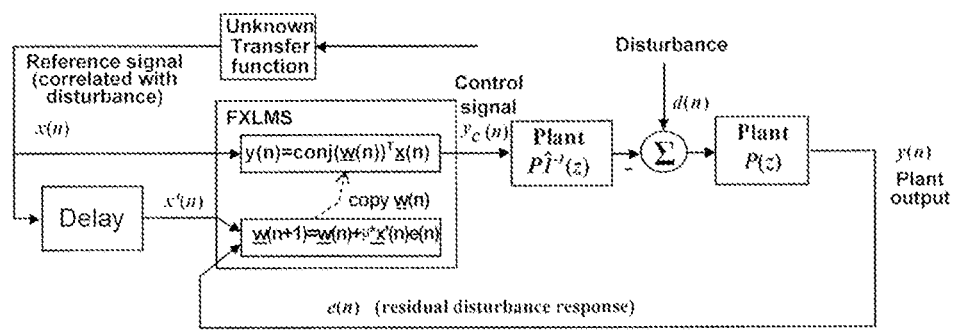
FIG. 16 is a block diagram for an ADRC algorithm.

The FXLMS algorithm uses controller tracking error to drive the LMS adaptation algorithm. Since the adaptation is driven by the controller tracking error, $\underline{w}(n)$ will be driven toward the optimal solution as long as the adaptation is stable. To ensure that this approach is stable and converges, the controller has to (at least roughly) anticipate the frequency response of the so-called "secondary path" dynamics (shown as P(z) in FIG. 16, however in this document we refer to it as $H_2(s)$). The FXLMS algorithm accomplishes this by pre-filtering the reference signal used to adapt the filter weights with a filter which approximates $H_2(s)$, as shown in the diagram of FIG. 15. Recall that the $H_2(s)$ dynamics are what relate motor current commands to the measured reaction torque at the motor housing ($y_2$). This includes the dynamic response of the current control loop, and mechanical resonance due to the motor housing inertia and the finite stiffness of the load-cells and mounting interface structure.

It would be computationally expensive to implement a bank of filters for a very long vector x(n) (a large number of target harmonics) if the secondary path dynamics had to be approximated by a filter $H_2(z)$ operating in the time domain. Such a filter would have to be duplicated k times for k target harmonics. Since the ADRC control stage acts through the previously described MRAIC and active damping stages it "sees" a pre-compensated plant characteristic. This pre-compensation approach allows for consideration of the secondary path dynamics from the viewpoint of the ADRC as a pure time delay. This results in a large computational savings for cases where many (possibly hundreds) of torque-ripple harmonics are targeted for cancellation. Rather than having to implement N filters approximating $H_2(s)$, we only have to phase-shift the reference (angle domain) sinusoids appropriately with respect to the torque ripple wavenumber and the RPM of the motor. Applying a phase shift to the torque ripple basis functions (angle domain sine/cosine pairs) is computationally simple.

The ADRC algorithms developed for the system are based on the pre-compensated FXLMS algorithm (see generic diagram in FIG. 16) but for the system the reference signal is generated from the motor shaft encoder position. Sine/Cosine pairs for targeted torque ripple harmonics are functions of the encoder position, and the ADRC operates in the angle domain. In another aspect an alternate fast-block ADRC approach employs FFT transformations and operates in the wavenumber domain.

The system ADRC controller takes advantage of the quasi-periodic nature of the torque ripple disturbance, and adapts its control parameters in order to track the amplitude and phase of the targeted torque ripple harmonics. The algorithms used for adaptation, and signal processing methods required depend on the operation scenarios. The operating scenarios and related ADRC requirements are discussed herein.

The torque-ripple cancellation performance levels which can be achieved, and the control techniques which work best, greatly depend on the actuation task at hand. We have considered three relatively broad types of operation.

In Quasi Steady State Operation, motor RPM and torque remain nearly constant for long periods of time. This is the simplest possible operating case, where torque ripple waveforms (as a function of motor shaft position) do not change rapidly. In repetitive servo cycles with significant transients, commanded motion is deterministic and repetitive. Motor RPM and torque may vary slowly or abruptly over any range within a servo cycle. Load characteristics are mostly deterministic, but with some random variation (for example friction or viscous damping could vary randomly about a nominal value, from cycle to cycle). In general non-deterministic operation, neither the commanded motion, nor the load characteristics are known a-priori. This is the most challenging case, where the nature of the commanded motion and load characteristics may change arbitrarily over time.

We have investigated various means of ADRC to mitigate torque ripple under the three types of motor operation described above. The level of difficulty increases as we progress from operational scenario (1) to (3), since the controller must deal with more changes in the underlying torque ripple under transient operating conditions, and compensation for these changes is more difficult when operating conditions are less predictable. It was decided to approach this problem starting with the first scenario (easiest) and progressing toward the third (most difficult).

Scenario (1) describes applications with constant or slowly changing RPM and load such as a pump drive. This steady-state operation scenario provides good baseline data for understanding the key challenges in the development of a robust and effective torque ripple cancellation algorithm. Scenario (1) was mainly used to evaluate a class of algorithms we will refer to as "continuous online adaptation". These algorithms adapt continuously throughout the normal operation of the actuator, attempting to track the optimal disturbance cancelling command without any regard for the operating condition. These algorithms are very effective, provided that the optimal disturbance cancelling command changes slowly compared to the adaptation time constant. These algorithms become ineffective when operation is dominated by transient operations such as abrupt changes in current (load torque).

Scenario (2) describes common applications such as valve actuation. Scenario (2) was used to evaluate a class of algorithms we will refer to as "block-wise offline adaptation". Block-wise offline adaptation takes advantage of any predictability in the motor operating conditions which will be encountered during a servo cycle (such as opening or closing a valve). While there may be some uncertainty in the load characteristics (friction for example), there is some nominal expected value about which random variations occur. Furthermore, the commanded motion is repetitive so we can anticipate (to some degree) the load characteristics as a function of motor shaft position. Scenario (2) was also used to evaluate the effective combination of continuous online and block-wise offline adaptation.

The third operational scenario, "general non-deterministic operation" describes applications such as control surface or thrust vectoring actuators. In these applications the duty cycle may be continuous or intermittent, and neither the load characteristics nor the servo motion command profiles are known ahead of time. This is the most challenging operational scenario for adaptive disturbance canceling; especially when the load or commanded motion includes fast transients. In this context "fast" means having time constants that are shorter than those of the continuous online adaptation in the angle domain, or roughly speaking large changes in motor torque which occur within less than a full turn of the motor shaft. Scenario (3) was used to evaluate a new class of algorithm that we call "continuous online adaptation with control parameter scheduling". This class of algorithm is more complex than the others and it employs advanced signal processing techniques to properly characterize the sensed torque ripple harmonics as a function of one or more operating condition scheduling variables.

The following is an outline of the algorithms. In continuous online adaptation, control parameters are updated continuously during operation, without regard to operating condition. For angle domain, control parameter adaptations are performed in the motor shaft angle domain and updated every time slice. Performance is best when target harmonics are few and/or well separated in angular wavenumber (harmonic number). For wavenumber domain, control parameter adaptations are performed in the wavenumber domain (transformed from the motor shaft angle domain via the Fourier transform) and updated once per motor shaft revolution. This approach is very effective when targeting many harmonics and/or closely spaced harmonics. For a hybrid, control parameters for a small subset of dominant harmonics are adapted in the angle domain. The larger set of remaining harmonics is updated in the wavenumber domain. The hybrid approach combines strengths of angle domain and wavenumber domain, and has demonstrated the best overall performance. In block-wise offline adaptation, controller parameters are updated once per servo cycle (22 turns) of the motor shaft for our example valve actuation application). This is an anticipatory control strategy which relies on the repetitive nature of servo cycles. In continuous online adaptation with control parameter scheduling, controller parameters are updated periodically (every N turns of the motor shaft) throughout operation with regard to operating condition. Multi-dimensional lookup tables store controller parameters which are a function of operating condition scheduling variables (motor current rms amplitude in particular). Localization in motor shaft angle (and therefore with respect to scheduling variables) vs. localization in wavenumber is accomplished via the Discrete Orthogonal Stockwell Transform (DOST).

The three basic classes of algorithm (continuous online, block-wise offline, and continuous online adaptation with control parameter scheduling) have their respective strengths and weaknesses. All three can be viewed as stochastic gradient descent algorithms, but they differ greatly in terms of their ability to track non-stationary optimal control parameters, the degree to which they can anticipate disturbances, their computational complexity and requirements for real-time I/O and computation speed.

The table below provides a high level summary of the algorithm attributes such as tracking/predictive capability and computational complexity.

TABLE

Algorithms for Adaptive Disturbance Rejection Control

| Control Method | | Tracking of optimal control parameters | Anticipation of toque ripple disturbance | Ability to handle many closely spaced harmonics | Algorithm Complexity |
|---|---|---|---|---|---|
| 1. Continuous Online Adaptation | a) Angle Domain | Excellent. Can converge within several cycles of target harmonic | Only for quasi-steady operating condition | Poor. Convergence performance suffers for large numbers of tightly clustered harmonics | Low |
| | b) Wavenumber Domain | Good. Can converge in roughly 3 revolutions of the motor shaft | Only for quasi-steady operating condition | Excellent. Very effective at handling large numbers of tightly clustered harmonics | Medium |
| | c) Hybrid | Very Good | Only for quasi-steady operating condition | Excellent, since method 1.b. is used for the large number of higher harmonics | Medium |
| 2. Block-Wise Offline Adaptation | | Poor. Can only use information from prior servo cycles | Excellent to the degree that servo cycles and load characteristics are fairly repeatable | N/A (Batch mode computation. Not harmonic based) | Medium |
| 3. Continuous Online Adaptation with Control Parameter Scheduling | | Fair. Can re-use compiled data from previous encounters with a given operating condition | Very Good. Can re-use data from previous encounters with given operating condition | * TBD | High |

Figure 17:
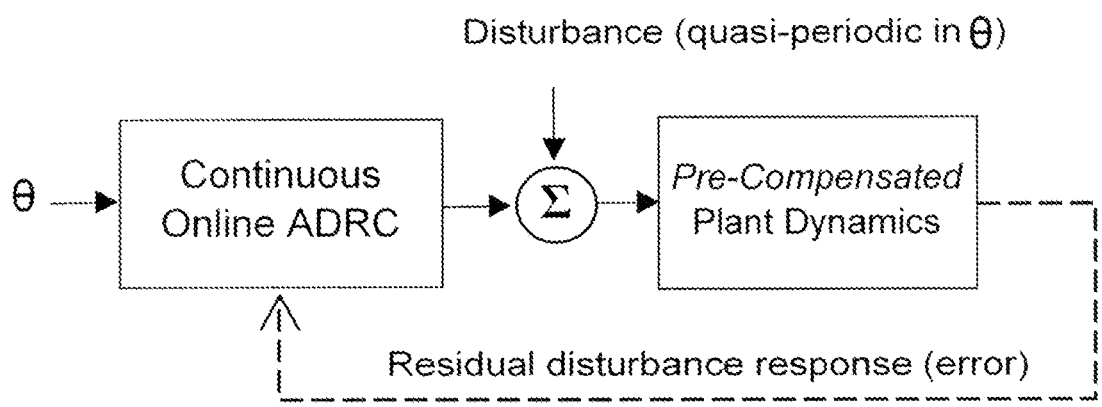
FIG. 17 is a simplified diagram illustrating the error-driven nature of the continuous online adaptation approach to ADRC.

Continuous online adaptation is performed throughout normal actuator operation. As shown in FIG. 17, the continuous online adaptation attempts to estimate torque ripple disturbance as a periodic function of the motor shaft position. The algorithm is harmonic based, and the controller parameters correspond to the Fourier coefficients of the torque ripple compensating current command. The adjustment of the ADRC parameters is driven by the sensed residual error. The ability of this type of algorithm to track the optimal control parameters (in the practical case where they are non-stationary) is analogous to a classical type I feedback controller, where tracking a ramp function results in a steady error due to lag in the controller's corrective action.

As indicated in the table, there are several variations of the online adaptation method with tradeoffs between convergence performance, ability to handle large numbers of target harmonics, and algorithm complexity. There are essentially two methods of adapting to the magnitude and phase of the torque ripple harmonics: the angle domain method, and wavenumber domain method. The "hybrid" simply makes use of both methods for different subsets of the targeted harmonics.

The angle domain method amounts to cross-correlation between the measured torque ripple response and the reference sine/cosine waveforms driven by multiples of the measured motor shaft angle (the multiples corresponding to the targeted harmonics or wavenumbers). The wavenumber domain method acquires a block of torque ripple response data and estimates the harmonics using Fourier transform methods. The angle domain method is most effective at tracking a non-stationary solution; since it updates the control parameters every time slice. But the convergence performance of the time-domain method suffers when many, closely-spaced harmonics are targeted simultaneously. The wavenumber method has more limited tracking capability because it must acquire data for one entire revolution of the motor shaft between updates of the control parameters. However, it outperforms the angle domain method when large numbers of closely spaced harmonics are targeted simultaneously.

These complimentary aspects of the angle domain and wavenumber domain methods are what motivated the "hybrid" approach, where the dominant few (up to 30) harmonics (mostly well separated in wavenumber) are estimated using the angle domain approach and the remaining (up to 200 or more) targeted harmonics are estimated using the angular-wavenumber domain method. The hybrid approach combines the strengths of the angle and wavenumber domain methods, and has demonstrated the best overall convergence performance.

The angle domain version is the continuous online ADRC that is the most computationally straightforward.

Figure 18:
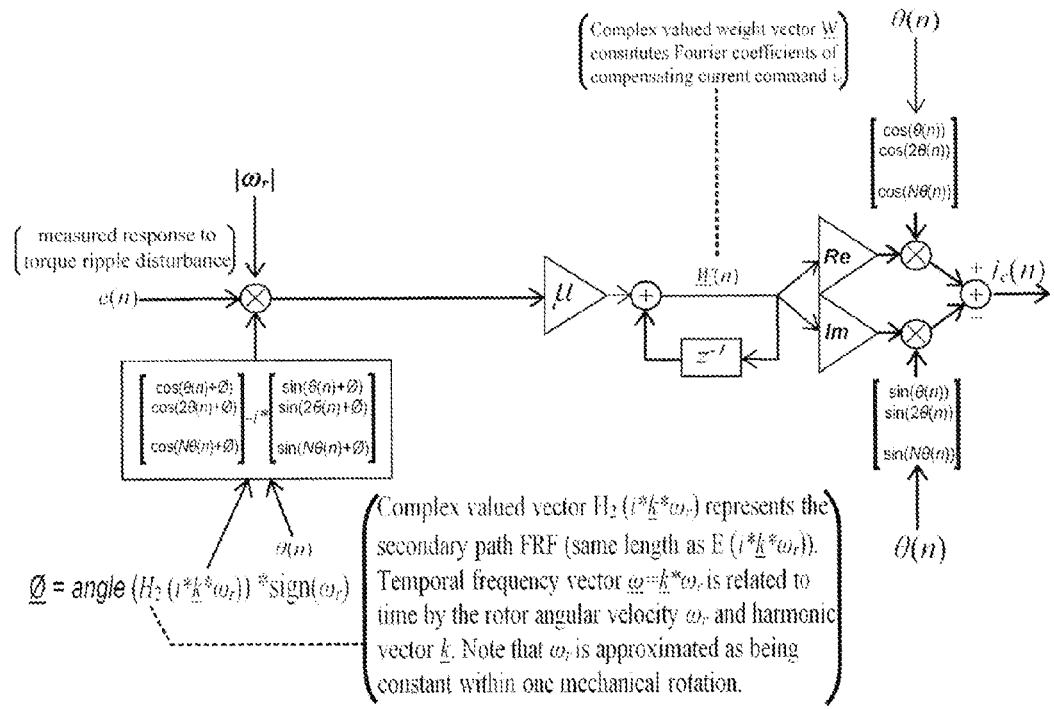
FIG. 18 is a detailed signal processing diagram.

This algorithm is loosely based on the FXLMS algorithm, with some interesting differences. See FIG. 18 for a detailed signal processing diagram.

The reference signal is the motor shaft angle (encoder). A complex valued reference signal vector x(n) is generated with the real part corresponding to a cosine waveform and the imaginary part a sine waveform. The vector x(n) contains N elements corresponding to the N targeted harmonics. Rather than employing a bank of N time domain filters for each of the x(n) waveforms, we simply shift the phase of each waveform as appropriate with respect to the secondary path transfer function H2(s), and the motor velocity. Recall that our precompensation approach result in H2(s) being well approximated by a time delay, so the phase shifts can be computed knowing this time delay and the motor velocity.

x(n) is multiplied by the sensed torque-ripple response e(n), and scaled by the motor velocity ωr. The output of the multiplier is multiplied by the step size μ and added to the weight vector ω(n−1) each time slice. One can view this as a running cross-correlation operation in the angle-domain Since we are actually performing the signal processing operations in the time domain, we must apply the motor velocity scaling to keep the rate of adaptation consistent in the angle domain.

Each time slice, the output stage of the ADRC controller uses the current weight vector coefficients to compute the command output ic(n) as a weighted sum of the (un-phase-shifted) reference vector. In a steady state scenario, the adaptation will proceed until the mean value of the cross correlation of e(n) and (phase shifted) x(n) is zero (i.e. all the torque-ripple that is correlated with x(n) has been canceled), at which point the weight vector will maintain constant values.

The output stage of the ADRC shown here is exactly the same for all the Continuous Online adaptation methods enumerated in the Table (control methods listed under 1 and 3). What differs between the various methods is the signal processing approach to determining the weight vector w(n) to use in forming the command $i_c(n)$ each time slice.

The wavenumber domain version of the continuous online ADRC employs a different signal processing approach to adapting the weight vector w(n). Rather than adapting the weight vector "on the fly" it gathers the torque ripple response data e(n) for an entire mechanical rotation of the motor. The e(n) data is recorded as a function of mechanical angle. In other words, buffered time histories e(n) and θ(n) are re-sampled to yield e(θ). An angle history e(θ) over one mechanical rotation constitutes a single "block" of data. At the end of each block e(θ) is transformed into the wavenumber domain via the FFT, yielding E(Ω).

The weight vector w(N) is updated once per block. This may seem like a big disadvantage, but it is not. Because the block of data yields much more precise information about the cross-correlation of e(n) with x(n), we are making larger, more accurate weight vector adjustments less often. In effect we have drastically reduced the "gradient noise" associated with the stochastic gradient descent approach by using more data in our approximation of the gradient. In fact, we have found that the wavenumber domain adaptation approach is superior to the angle-domain approach when many closely spaced wavenumbers (torque ripple harmonics) are targeted simultaneously.

Figure 19:
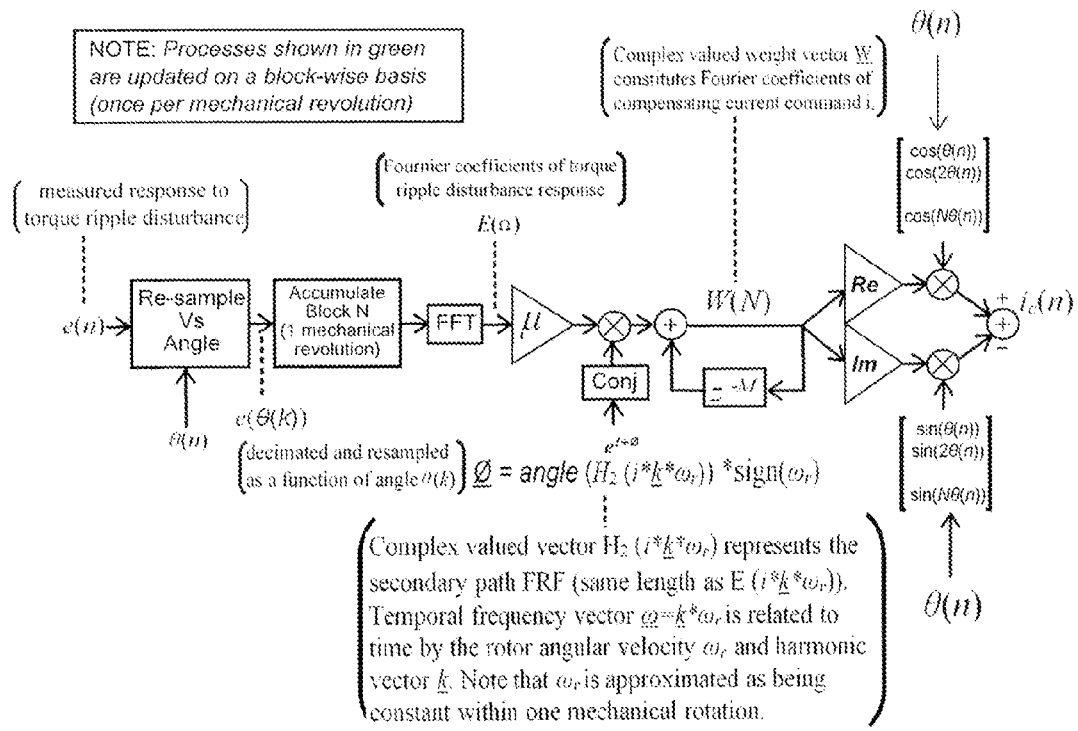
FIG. 19 is a signal processing diagram that summarizes the wavenumber domain version of the continuous online ADRC.

FIG. 19 contains a signal processing diagram which summarizes the wavenumber domain version of the continuous online ADRC. Note that the output stage is identical to that used for the angle domain algorithm and it is updated every time slice.

The hybrid method for continuous online adaptation is easily explained, and easy to implement, given the angle-domain and wavenumber-domain algorithms. To implement the hybrid method, simply partition the set targeted torque ripple harmonics into two subsets. Then implement both angle domain and wavenumber domain adaptation algorithms in parallel, assigning one subset of the targeted harmonics to each. Simulation trials have shown that the Hybrid method outperforms the two constituent methods when the harmonic subsets are chosen properly.

The optimal selection was determined as follows. The angle domain algorithm is used to address the set of harmonics 1–Nw, choosing Nw so that the set contains the dominant lowest order torque ripple harmonics that are due to current measurement errors and reluctance torque (cogging). For our 12 pole-pair ONR motor this corresponded to harmonics 1-27. The wavenumber domain algorithm is used to address all the targeted harmonics greater than Nw. The wavenumber domain method is capable of handling a fairly massive number of harmonics, and we found that it was possible to target all harmonics up to the limits dictated by the maximum motor RPM and useful bandwidth of the servo drive current loop, and still achieve very good convergence performance. Of course in practice this will be subject to computational resource constraints.

Assuming the computational resources can be afforded, our simulation studies suggest that the hybrid method will yield the best overall performance for continuous online ADRC.

Figure 20:
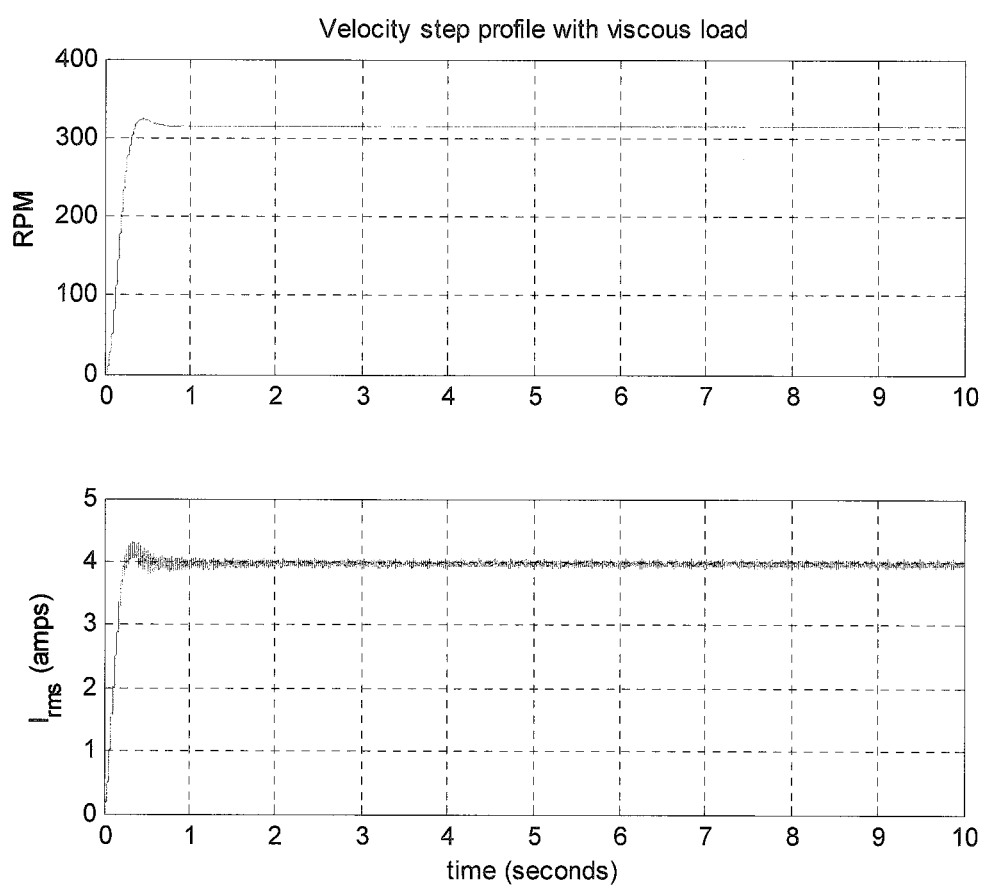
FIG. 20 is a pair of graphs showing the simulated velocity step response.

In this section we present simulation results for all three continuous online ADRC methods and compare their relative merits. The integrated model of the ONR motor and drive was configured with a steady-state load consistent to our hardware test bed. A viscous load was assumed, which resulted in roughly 4 Arms motor current (roughly half the max rated motor current) at 320 RPM. FIG. 20 shows the simulated velocity step response scenario.

Figure 21:
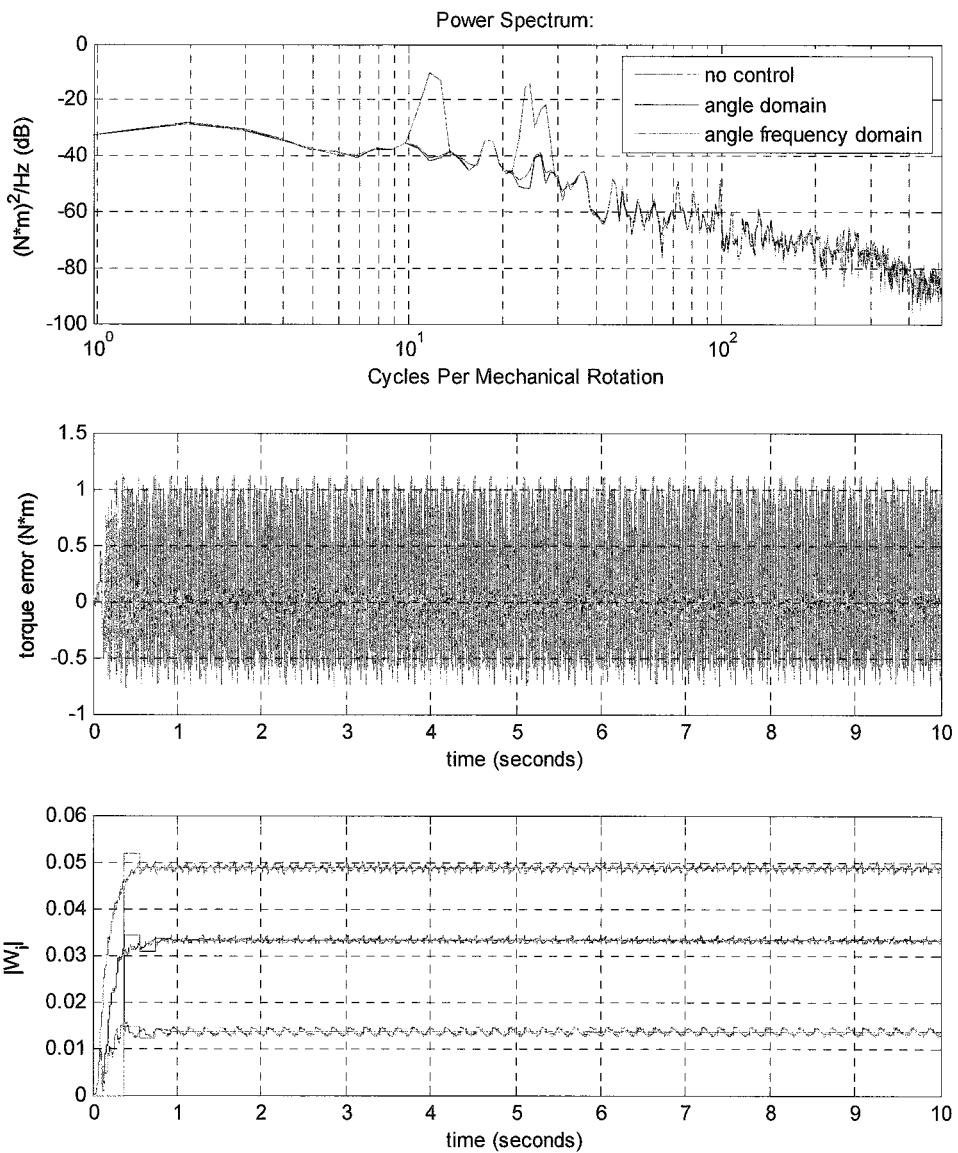
FIG. 21 is a series of plots showing results of the angle domain and wavenumber domain continuous online ADRC methods overlaid on the same plots to facilitate a comparison of their performance in each simulation.

The plots in FIG. 21 show results of the angle domain and wavenumber domain continuous online ADRC methods overlaid on the same plots to facilitate a comparison of their performance in each simulation.

The three overlaid traces correspond to no Control, angle domain ADRC, and wavenumber domain ADRC.

Three subplots are shown for each simulation. The subplots are torque ripple power spectra (wavenumber domain), torque ripple time history, and ADRC controller weight vector (magnitude) time history. The PSD plots shown in the top subplot exclude the first 10 motor turns, and therefore represent the quasi-steady state performance. So another important measure of merit for each test case is the startup transient (shown in the torque ripple time history) in terms of the peak transient torque ripple amplitude and the approximate convergence time.

The first scenario below is for the very conservative case of only targeting the three largest harmonics: Harmonic 12 (mainly due to current offset error), 24 (mainly due to current measurement scaling error), and 27 (mainly reluctance torque due to pole-slot passing effects). Both methods perform comparably.

For both methods, the weights converge to near constant values within 3 mechanical rotations of the motor shaft. The startup transient allows roughly baseline torque ripple amplitudes during the first ⅓ second of the load case.

Figure 22:
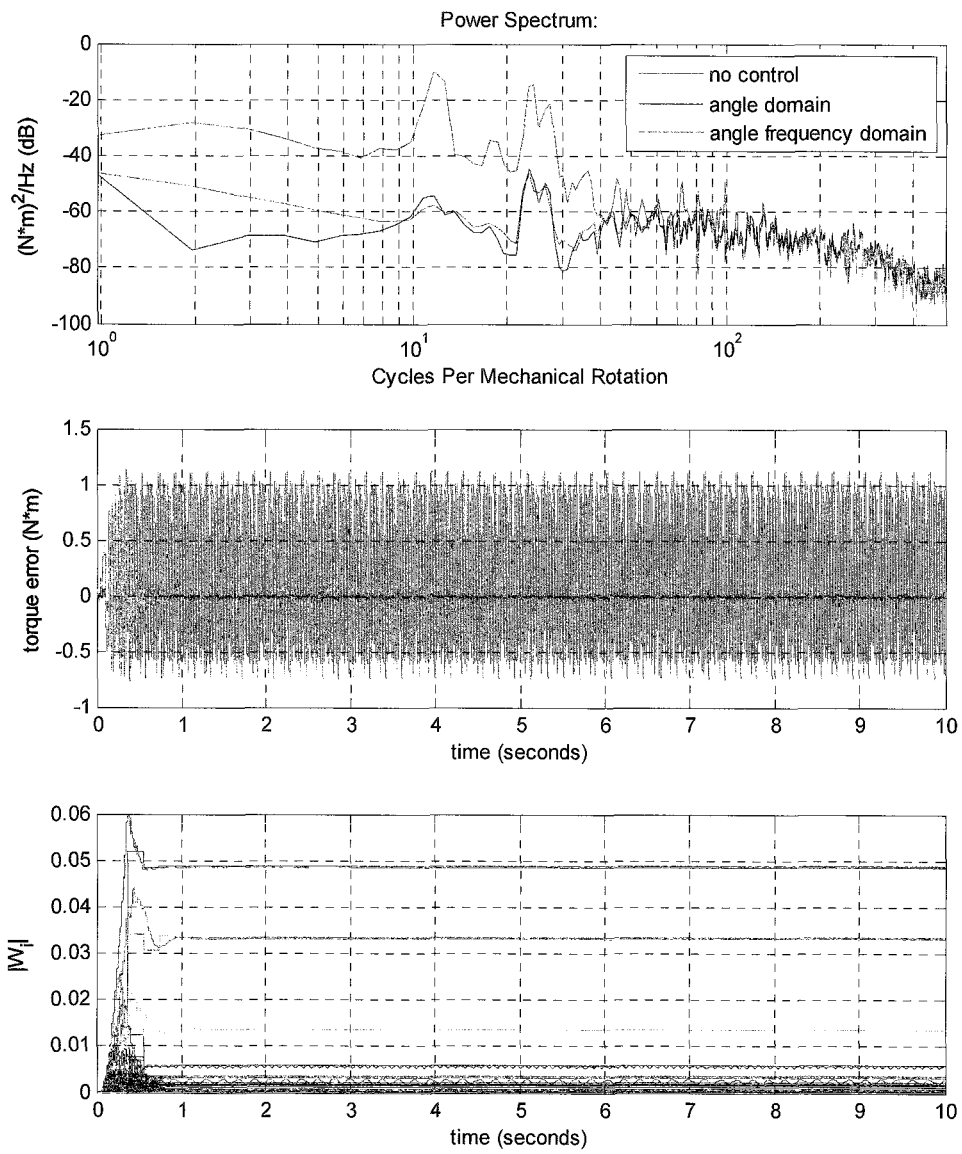
FIG. 22 is a series of plots showing results of the angle domain and wavenumber domain continuous online ADRC methods overlaid on the same plots to facilitate a comparison of their performance in each simulation.

In the second scenario shown in FIG. 22, we target the 52 highest harmonics. Still, both methods perform comparably. A little overshoot is evident in the weight dynamics for the angle domain method. The weight dynamics of the wavenumber domain method are identical to the 3-harmonic case. For both methods we have realized a marked improvement in attenuation due to the greater number of harmonics which are being cancelled.

Figure 23:
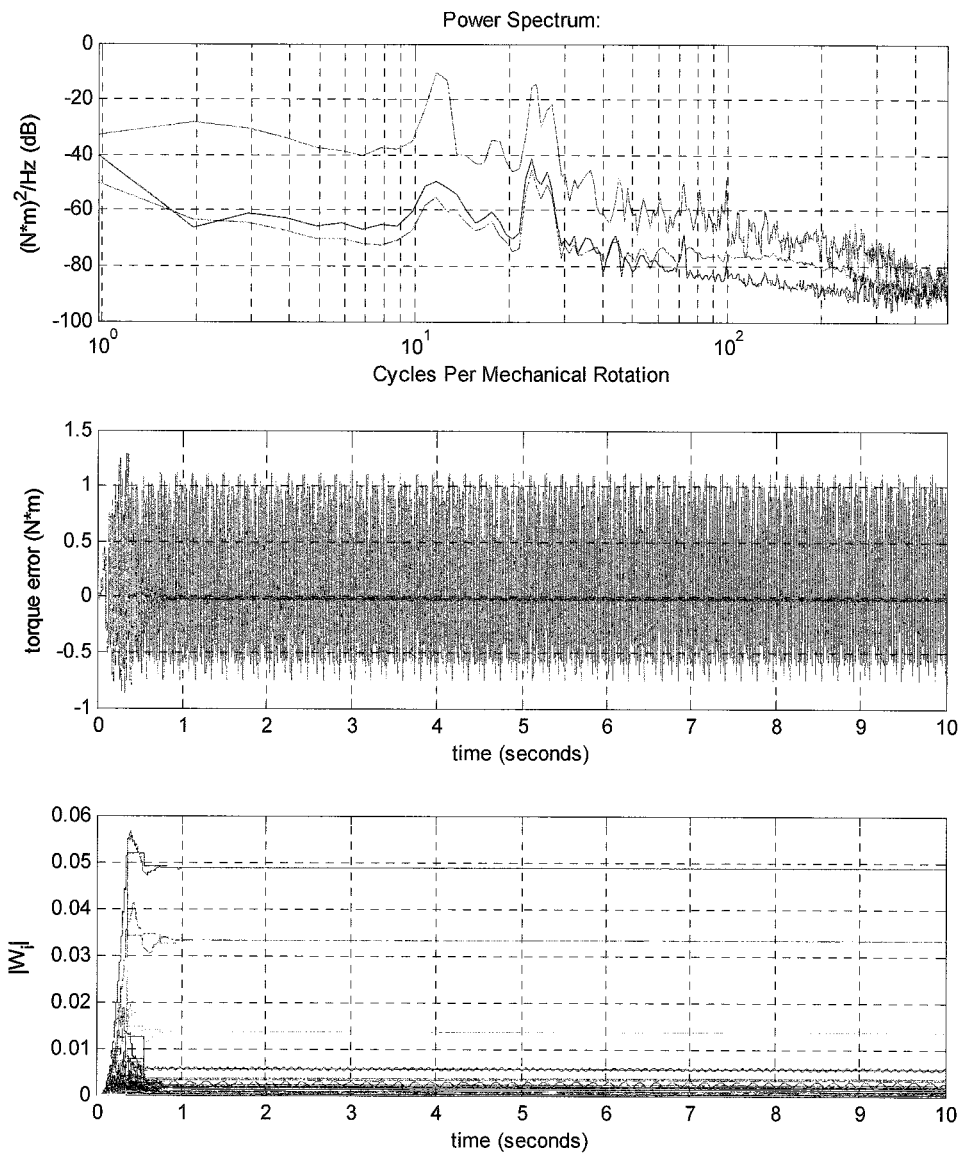
FIG. 23 is a series of plots showing results of the angle domain and wavenumber domain continuous online ADRC methods overlaid on the same plots to facilitate a comparison of their performance in each simulation.

For both methods, the weights converge to near constant values within 3 mechanical rotations of the motor shaft. The startup transient allows roughly baseline torque ripple amplitudes during the first ⅓ second of the load case. In the third scenario shown in FIG. 23 the 512 highest harmonics are targeted. Now the wavenumber domain show slightly better performance in terms of the dominant peaks in the residual torque ripple PSD. Still the weight dynamics of the wavenumber domain method are identical to the 3-harmonic case. The angle domain method is by no means deficient and handles the 512 harmonic cases well.

Figure 24:
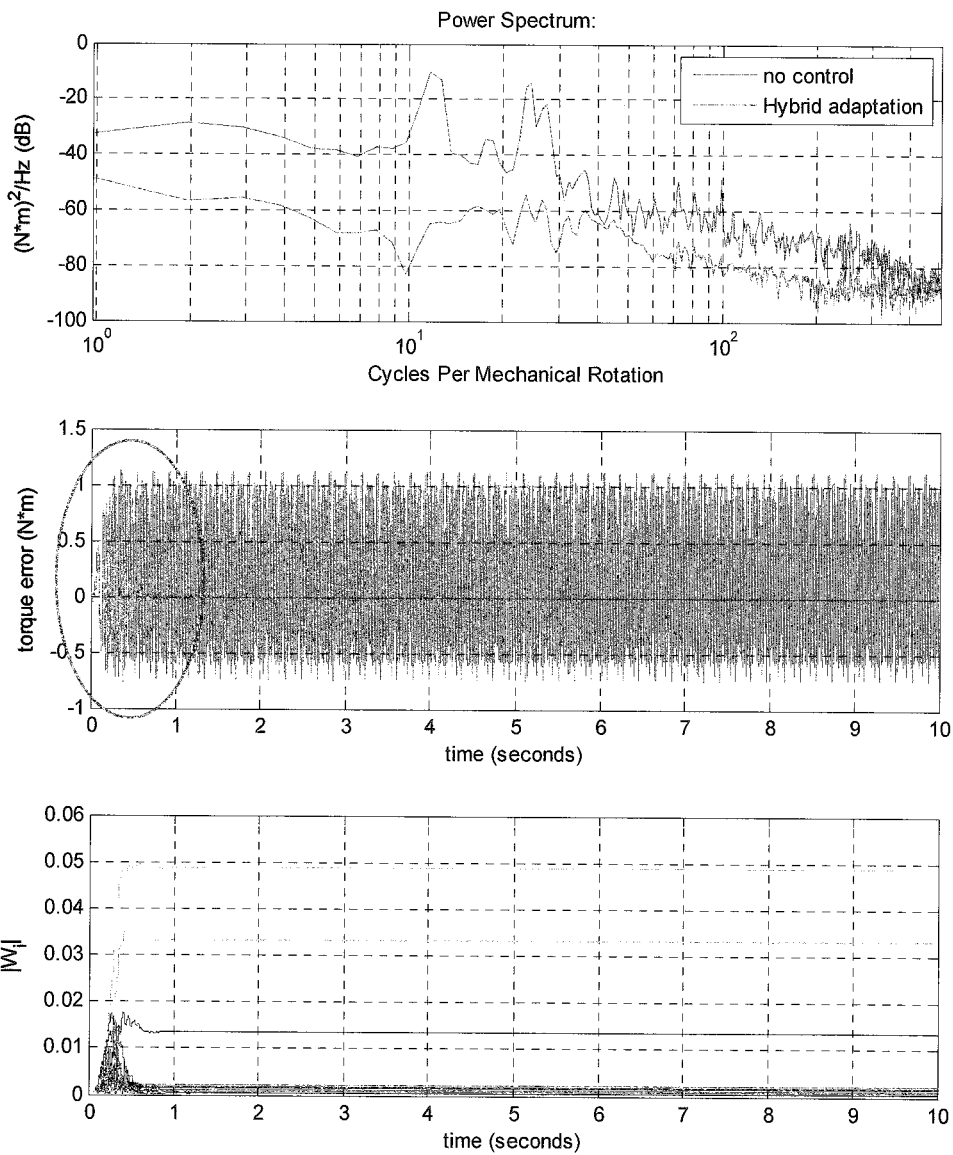
FIG. 24 is a series of plots showing results of the angle domain and wavenumber domain continuous online ADRC methods overlaid on the same plots to facilitate a comparison of their performance in each simulation.

For both methods, the weights converge to near constant values within 3 mechanical rotations of the motor shaft. The startup transient allows roughly baseline torque ripple amplitudes during the first ⅓ second of the load case (the angle domain method may overshoot a little more, and take slightly longer to converge). In the last scenario shown in FIG. 24 the 512 highest harmonics are targeted again. Only this time we partition the targeted harmonics into two groups. We use the angle domain method to adaptively cancel harmonics 1-27 (this includes the 3 dominant harmonics). We use the wavenumber domain methods to adaptive cancel the remaining harmonics up to 512.

With the hybrid method we get a markedly quicker convergence (roughly within 2 mechanical rotations of the motor shaft) and the startup transient allows only half the baseline torque ripple amplitudes during the first ⅓ second of the load case It turns out we can use a larger step size for the angle domain method when we target fewer modes, and it therefore yields an overall advantage when we select a dominant subset of the torque ripple harmonics to be adaptively cancelled via the angle domain algorithm and use the wavenumber domain algorithm to go after the rest.

The continuous online ADRC algorithms are inherently scalable, since any combination of target harmonics can be selected for adaptive cancellation. Here there is a fundamental tradeoff between computation resources and performance. Our simulation and experimental work has shown that a great deal of torque ripple attenuation (roughly 10 dB, chiefly depending on the magnitude of current-measurement errors in the BLDC drive) can typically be realized by only compensating three harmonics (those corresponding to current measurement offset errors, scaling errors, and the fundamental cogging harmonic). An additional 10 dB attenuation (total of roughly 20 dB) can be achieved by targeting numerous higher harmonics (typically on the order of 100). As the number of targeted harmonics increases, there tend to be diminishing returns (just a natural consequence of the torque-ripple energy distribution in the wavenumber domain).

The continuous online ADRC can only anticipate the torque ripple disturbance to the degree that the operating condition changes slowly relative to the lag in its adaptation response. If the torque ripple disturbance were truly a stationary signal, periodic in the motor shaft position, then there would be a single set of optimal controller coefficients, and after initial convergence, these parameters would remain constant. Unfortunately the underling torque ripple producing phenomena are much more complex and sensitive to various operating condition variables. So in practice the continuous error-driven online adaptation must track changes in the underlying disturbance characteristic on the fly. Because the continuous adaptation process is error-driven, the convergence of the filter parameters requires some finite rotation of the motor shaft. LMS filter theory, simulation and experimental verification all show that the convergence of the continuous adaptation process for this application exhibits an RPM-dependent time-constant which can be considered an "angle constant". In other words, the state of the filter convergence is related to the length of angular displacement traversed by the motor shaft (nominally independent of RPM). For this particular (12 pole-pair) motor we achieve convergence in roughly 2-3 revolutions of the motor shaft.

So during transient operations, where torque and speed changes are large within one motor revolution, and the underlying torque ripple varies greatly with current amplitude and motor velocity, the continuous adaptation will lag the optimal filter parameters substantially.

This fundamental limitation of online adaption has motivated the development of additional ADRC algorithms which can store and retrieve control parameter data with regard to operating condition. Stating it plainly, we need algorithms that can reuse old disturbance-response information in order to avoid the need to "re-learn" the optimal control parameters every time a given operating condition is re-encountered. These algorithms will be lookup-table based methods that employ batch-mode processing of buffered response data, associate post-processed data with operating conditions and store control parameter data for later use. The following sections describe these algorithms and the performance predicted in simulation.

Block-Wise Offline Adaptation

In applications where servoing cycles are repetitive, a greatly simplified approach to anticipation of transients can be applied. The second ADRC algorithm approach listed in the Table is called "Block-wise Offline Adaptation". This algorithm is an anticipatory control approach that is limited in its applicability, but is straight forward to implement and minimizes requirements for real-time numerical computation.

The most straight-forward application of lookup tables is that for repetitive servo actuation cycles, such as valve actuation. In these applications only a very small portion of the operating space (speed, torque) is encountered. Furthermore, it is reasonable to expect that the same series of operating conditions (or close to the same) will be encountered each time the actuation cycle is run.

Figure 25:
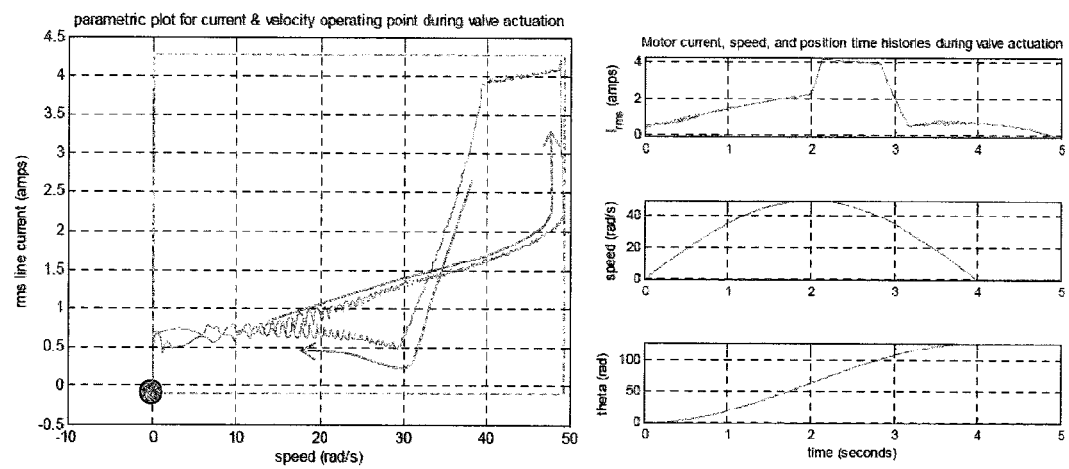
FIG. 25 is a series of graphs for a simulated valve actuator.

FIG. 25 illustrates this for a simulated valve actuator. In this simulation, the valve actuator load is dominated by friction in the actuator which is a function of the actuator position. The plot on the far left shows the current and velocity parametrically in time.

Figure 26:
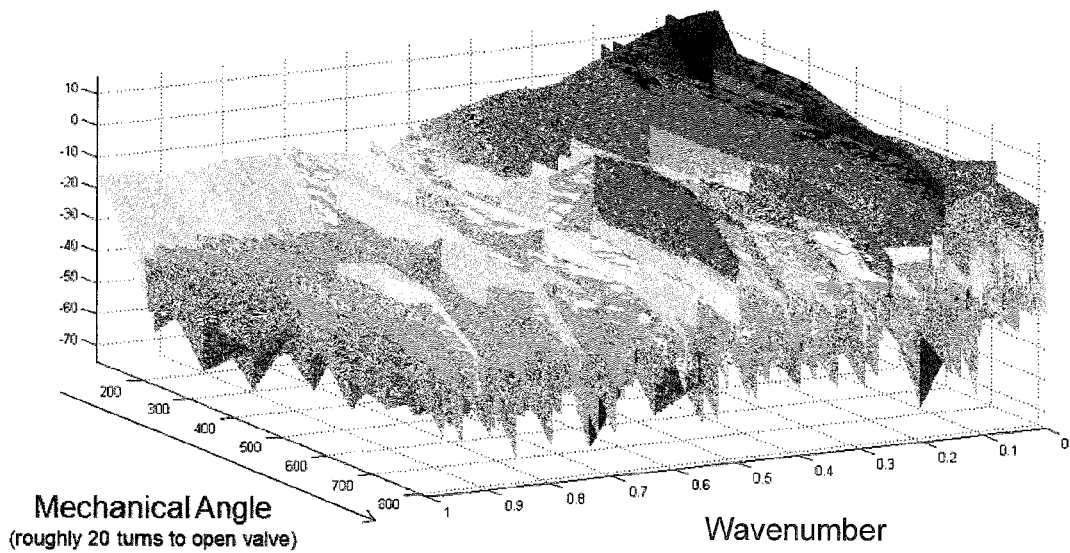
FIG. 26 shows an example spectrogram that reveals the changes in magnitude of the dominant torque ripple harmonics which occur during a 20 turn servo cycle.

The friction-dominated load exhibits some abrupt changes in required motor current even though the prescribed motor speed profile is smooth. FIG. 26 shows an example spectrogram which reveals the changes in magnitude of the dominant torque ripple harmonics which occur during this 20 turn servo cycle (their relative phase changes as well; the spectrogram only shows magnitude).

For repetitive servo cycles we expect that the magnitude and phase of the torque ripple harmonics will exhibit reasonable repeatability when analyzed as a function of the motor shaft angle. For an application such as this it would be overkill (and inefficient) to characterize the system over the entire speed and current range. A more practical approach would be to construct a table that specifically addresses the locus of operating conditions which the system transitions through in the typical load profile.

An algorithm using this approach has been established for the case of repetitive servo cycles. This algorithm is simple, well understood, and requires very little in the way of real-time computation. The algorithm is loosely based on pre-compensated filtered-X fast block LMS, where a block of data corresponds to a complete servo cycle. Block-wise offline adaptation is therefore performed on an ensemble basis. The block-wise offline adaptation algorithm attempts to anticipate the torque ripple disturbance for the entire servo cycle. This algorithm is still error-driven; however the residual error for an entire servo cycle is employed in a (non-real-time) batch process to update a lookup table which generates a torque ripple compensating command as a function of motor shaft position.

The objective of the Block-Wise Offline ADRC is to capture the main features of the torque ripple disturbance as a function of motor shaft position $\theta$. In particular, abrupt changes in the commanded current which occur due to transients in the servo motion command and/or load characteristic.

The block-wise adaptation process proceeds as follows. Time histories of the measured torque ripple response $e(n)$ and the motor shaft angle $\theta(n)$ (encoder) are acquired and saved in a buffer during the execution of the servo cycle. $e(n)$ is transformed via FFT into the frequency domain. $E(k)$ is filtered by the inverse plant transfer function to yield $E'(k)$ (causality is not an issue, because this is done as a batch process in frequency domain), $e'(n)$ is recovered via the IFFT. $e'(n)$ is resampled vs. the buffered time history of $\theta(n)$ to yield $e'(\theta)$. Note that $e'(\theta)$ constitutes a rough estimate of the compensating command that would cancel the torque-ripple which produced $e(n)$. $e'(n)$ is multiplied by the step size $\mu$ and added to the previous computed torque-ripple-compensation command $ic(\theta)$.

Figure 27:
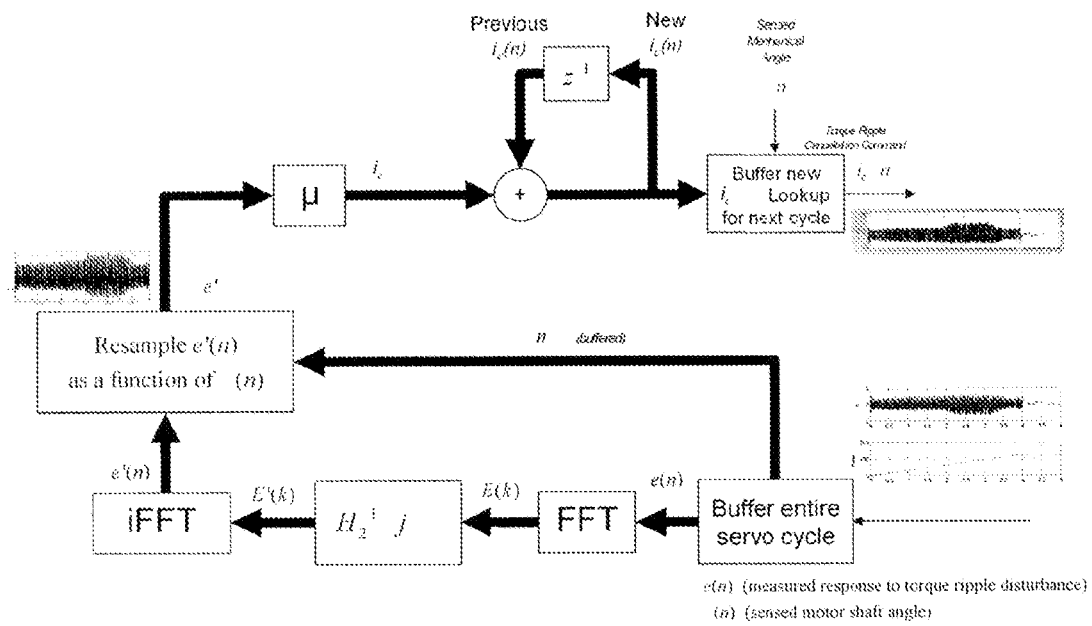
FIG. 27 is a signal flow diagram for a Block-Wise Offline ADRC.

Updates to the torque ripple canceling command are therefore applied only once per actuation cycle. This approach can be thought of as an ensemble-based adaptation. It works well as long as the load torque profile, motor speed profile and systematic commutation errors in the drive (mainly current measurement errors) change very little from one actuation cycle to the next. A signal flow diagram for this algorithm is shown in FIG. 27.

If one had perfect knowledge of the plant dynamics and the servo cycles and load characteristics were perfectly repeatable, then one could theoretically converge in a single cycle (choosing μ=1). But in practice with some variability in load and significant errors in our model of the plant dynamics, we have to take the gradient descent approach with a typical choice for μ of about 0.3. The value of μ is a tradeoff between how long it takes for the system to converge vs. how much the system reacts to random variations in the torque-ripple characteristics, resulting in poorer performance. Recall that the control objective of the offline ADRC is to capture the main features of the torque ripple disturbance as a function of motor shaft position θ.

For the Block-Wise Offline ADRC, high precision is not an option and very fast convergence is not useful. This has been demonstrated in the simulation work by introducing random variations in current measurement error and load friction in our valve-actuation model. The optimal tuning results in convergence within 10 to 20 actuation cycles of the valve, and limits changes in the buffered torque-ripple cancellation signal ic(θ) in response to the random variations in the torque-ripple characteristic that may be completely uncorrelated between ensembles. A reasonably long adaptation time constant allow the control parameters to find a "happy medium" within the scatter of the torque ripple characteristics which will occur on a servo cycle ensemble basis.

Figure 28:
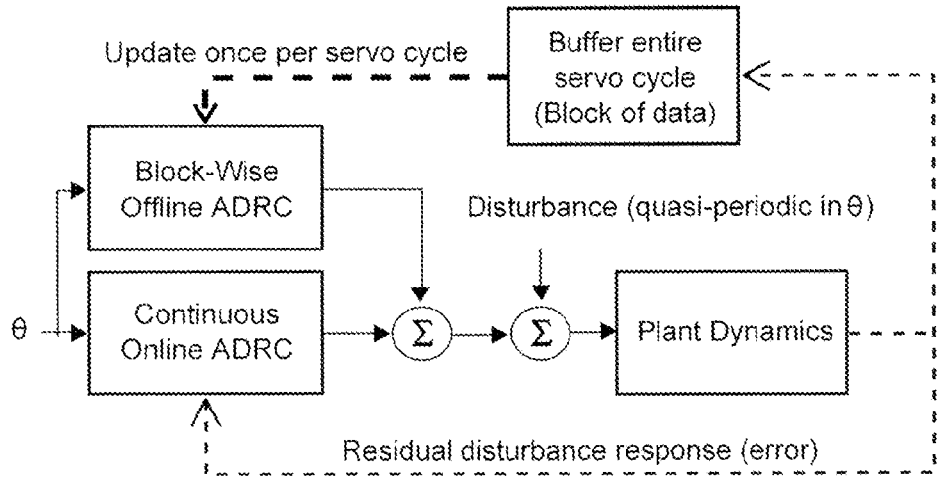
FIG. 28 is a block diagram for a combination of block-wise offline and continuous online adaptation for repetitive servo cycle applications.

In the practical case where the load characteristics (such as friction) are not perfectly repeatable as a function of θ, there will be some variation in the torque ripple disturbance as a function of θ. This sort of variation leads to corresponding variation in the optimal compensating current command. So the block-wise offline adaptation approach (which operates solely based on information from past servo cycles) is only effective to the degree that the servo motion profile and load characteristics are repeated as a function of motor shaft position. For this reason, block-wise offline adaptation is always applied in combination with continuous online adaptation. These two methods complement each other in a way analogous to a servo controller with (anticipatory) feed-forward control combined with (error driven) feedback control. The combination of block-mode offline and continuous online adaptation is illustrated in FIG. 28.

When running on-line adaptation in parallel with batch-mode adaptation, we need to take care to avoid adverse interaction between these processes. During this study, one effective means to accomplish this was identified. This consisted of logging the actions of the on-line adaptive current measurement error correction, and using this data to generate a command to "subtract out" the effect of this correction from the batch-mode adaptation, which effectively offloads the actions of the online adaptive cancellation to the batch-mode adaptive control of $i_c$, to the degree that the batch-mode adaptive controller can converge on a complete solution.

Equation 1: Removing Effect of On-Line Estimation of Current Measurement Error from Torque-Disturbance Error which Drives Batch-Mode Adaptation $$e_{iqc} = e_{iq} + \frac{(i_{qc})}{3}\left(\delta_A \cos(2\theta) + \delta_B \cos\left(2\theta + \frac{2\pi}{3}\right) + \delta_C \cos\left(2\theta - \frac{2\pi}{3}\right)\right) +$$

$$I_A \cos(\theta) + I_B \cos\left(\theta - \frac{2\pi}{3}\right) + I_C \cos\left(\theta + \frac{2\pi}{3}\right) + i_{ch}$$

Where $e_{iqc}$=quadrature-current-equivalent torque error time history with effects of online adaptive cancellation removed
$e_{iq}$=quadrature-current-equivalent torque error time history estimated by batch algorithm
$\delta_A, \delta_B, \delta_C$=current measurement scaling errors estimated by online algorithm
$I_A, I_B, I_C$=current measurement offset errors estimated by online algorithm
$i_{qc}$=quadrature current command There is no need to filter this correction since the quadrature current equivalent error $e_{iq}$ which drives the batch mode adaptation is estimated via a (frequency domain) inversion of the plant dynamics.

Since Block-Wise Offline ADRC may take 10 to 20 actuation cycles for the control parameters to converge, and reach a steady state level of performance, the system needs to be initialized upon commissioning as follows. Servo system is installed and functional checks are made with algorithms disabled. This establishes a baseline functionality status and baseline vibration levels. An automated commissioning procedure is run. The servo will run a system-ID measurement by injecting a band limited random noise signal via the torque ripple compensation current (ic) command interface. The measured secondary path transfer function H2(s) will be stored in flash memory. The Block-Wise Offline ADRC control parameters will be initialized by cycling the actuator 10 to 20 times. The torque ripple signature will be compared to baseline vibration levels to verify that the algorithms are operating at the expected level of performance.

Since the Block-Wise Offline adaptation approach can perform unrealistically well in the case of a perfectly repeatable load case, it was necessary to evaluate this ADRC approach using a Monte Carlo method, with realistic variations in load characteristics and servo drive commutation errors. A uniform distribution was chosen for simulated parameter variations. Two distributions were considered. One with +/−12.5% scatter and one with +/−25% scatter.

For the purpose of running ensembles of repetitive servo cycles, a set of current measurement offsets and scaling errors were defined:

$$\begin{bmatrix} I_A \\ I_B \\ I_C \end{bmatrix} = \begin{bmatrix} +0.06 \\ -0.03 \\ -0.03 \end{bmatrix} \text{(amps)} \quad \begin{bmatrix} \delta_A \\ \delta_B \\ \delta_C \end{bmatrix} = \begin{bmatrix} +0.02 \\ 0 \\ -0.02 \end{bmatrix} \text{(\% scaling error)}$$

These errors were then modulated with a set of uniformly distributed random numbers to produce random variations of +/−12.5% and +/−25% (see simulation results).

Figure 29:
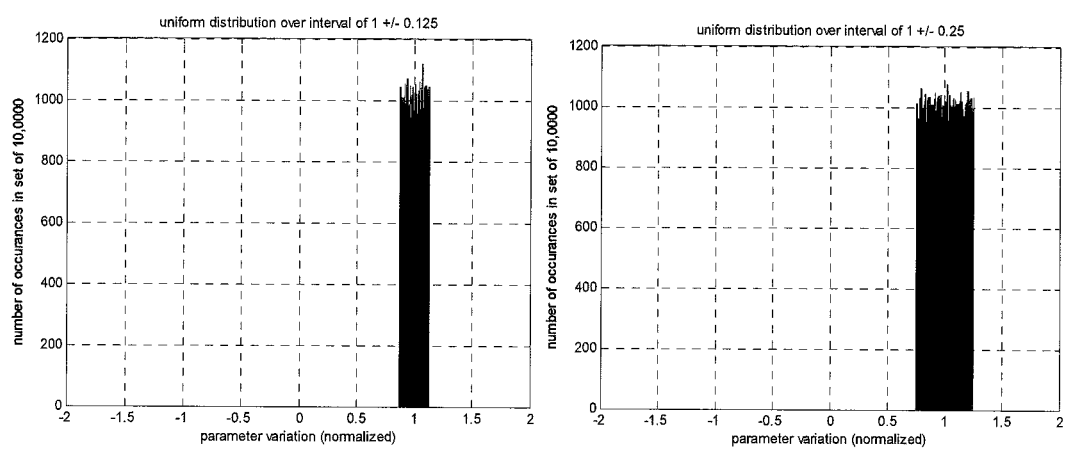
FIG. 29 illustrates simulation results for random variations about the nominal load friction.

The load model represents three main characteristics: inertia, viscous friction (damping), and running friction. The model has been configured such that running friction dominates. Running friction is a function of angular position, which means there will be abrupt changes in torque demanded by the load, even though the motion profile is essentially a constant velocity. In the simulations shown in FIG. 29, random variations of +/−12.5% and +/−25% about the nominal load friction have been considered.

Figure 30:
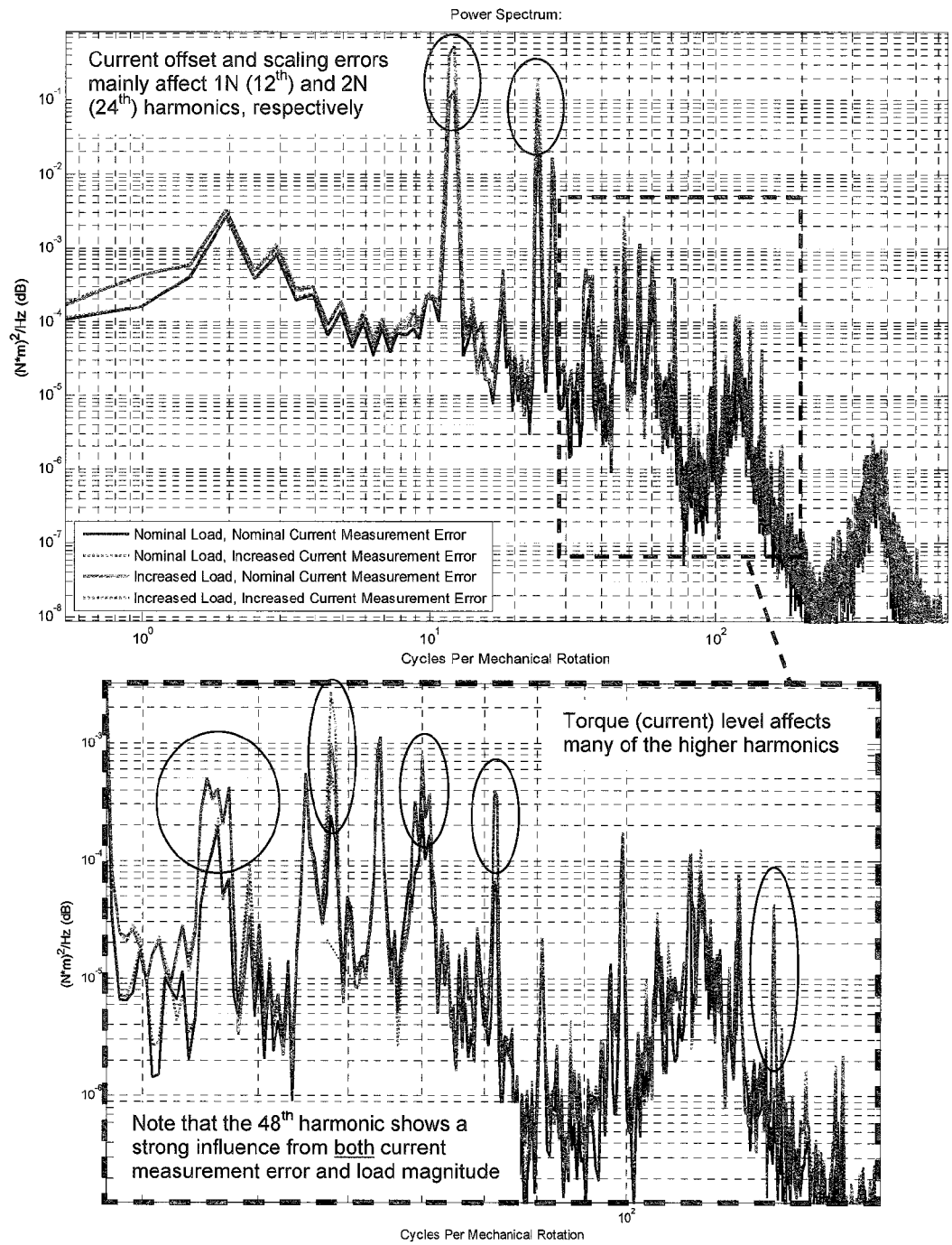
FIG. 30 is a set of graphs showing the variation in torque ripple harmonics with changes in current measurement error and load.

As shown in FIG. 30, an overlay of the harmonics versus variations in the load friction and current measurement error shows how their effects differ. The effect of current measurement error is mostly confined to the $12^{th}$ $24^{th}$ and isolated higher harmonics. As one might expect, the errors at these frequencies increase in magnitude as the current measurement offset and scaling errors grow. Load condition is more subtle, and results in changes in gain and phase of many harmonics. Whereas there is a well understood relationship between current measurement errors and the $12^{th}$ and $24^{th}$ harmonics, the effect of motor current magnitude on changes in torque ripple harmonics is complex and not easily accounted for.

This section summarizes some simulation work that has been done to evaluate the Batch-Mode Offline ADRC algorithm for repetitive servo cycles, determine optimal tuning parameters, and predict attainable performance. Attainable performance predicted by the simulated operating scenarios is presented.

Figure 31:
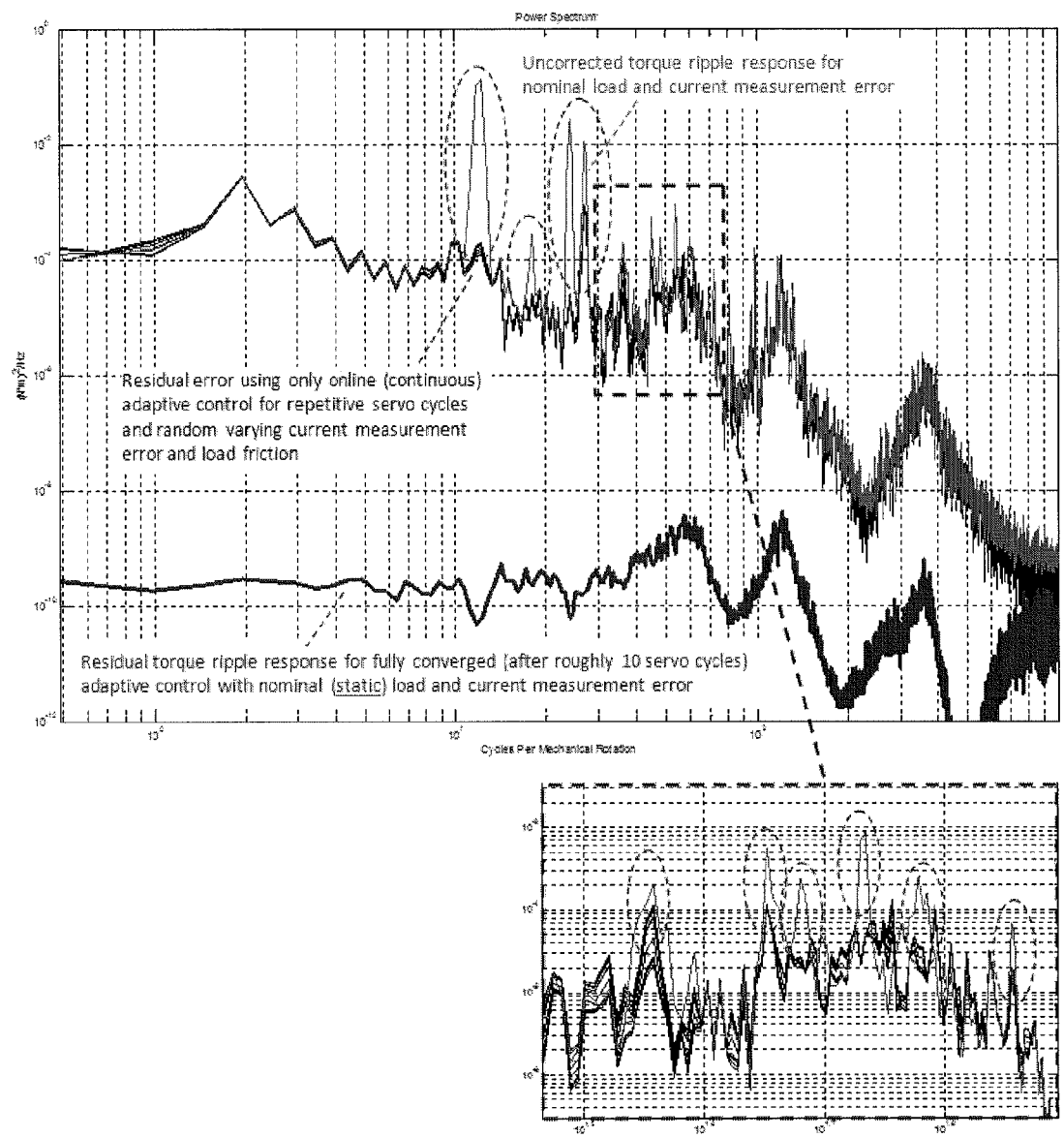
FIG. 31 is a pair of graphs illustrating a single ensemble of valve actuation servo profile with only continuous online ADRC.

As shown in FIG. 31, using only Continuous Online ADRC, the varying load condition makes it difficult track the optimal torque ripple-cancellation control parameters, so we only manage to attenuate a few dominant harmonics. Continuous Online ADRC proves capable of making significant reductions in torque ripple, yet if we want better performance we require some ability to anticipate (at least approximately) the optimal control parameters during transient operations, and cannot rely completely on adaptation "on the fly".

Figure 32:
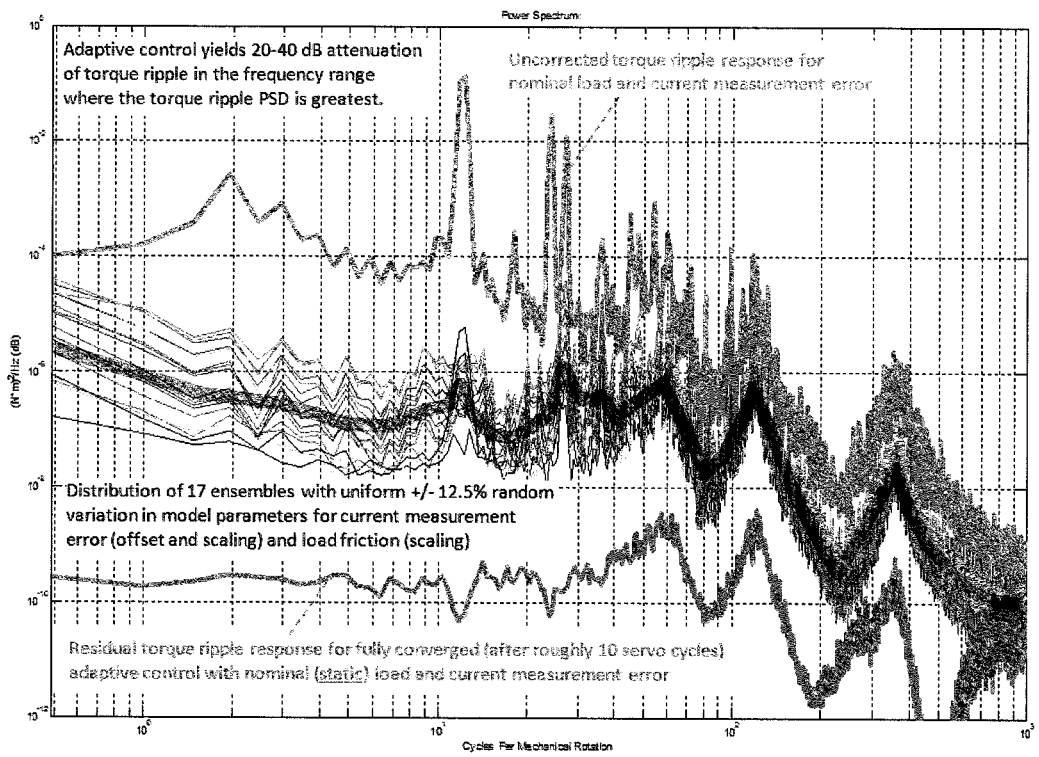
FIG. 32 is a graph showing the performance of a repetitive servo cycle algorithm.

Results for 17 ensembles of a Monte Carlo simulation are shown in FIG. 32. In this set of simulations the range of random variation in load and current measurement errors was +/−12.5% about the mean. The addition of the Batch-Mode Offline ADRC drastically improves the torque ripple attenuation beyond what can be achieved with Continuous Online ADRC alone. The results vary from run to run, but on average we achieve about 30 dB attenuation of the wavenumbers which carry the bulk of the disturbance power.

Figure 33:
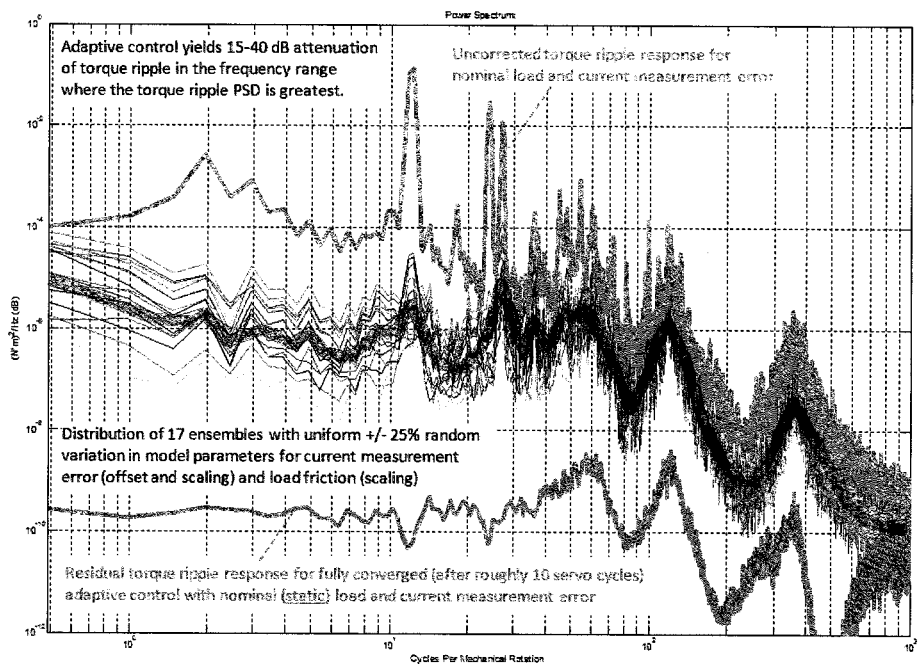
FIG. 33 is a graph showing the performance of a repetitive servo cycle algorithm.

Results for another 17 ensembles of a Monte Carlo simulation are shown in FIG. 33. In this set of simulations the range of random variation in load and current measurement errors was doubled to +/−25% about the mean. Still, the Batch-Mode Offline ADRC drastically improves the torque ripple attenuation beyond what can be achieved with Continuous Online ADRC alone. The results vary from run to run, but on average we achieve about 20 dB attenuation of the wavenumbers which carry the bulk of the disturbance power.

As the predictability of the motor operating conditions degrades, the effectiveness of the batch-mode table-lookup control will eventually become negligible and torque ripple mitigation will rely completely on the continuous adaptation.

For applications where motor operating conditions during a servo cycle cannot be predicted ahead of time (due to uncertainty in the servo commands and/or the load), a more general approach to anticipating torque ripple and associated control parameters for effective cancellation is required.

This more general and challenging operating scenario is what motivates the final class of ADRC algorithms.

A strategy of associating torque ripple control parameters with operating condition tends to drive us toward a lookup-table based implementation. A notional idea of what tables for torque ripple canceling control should do is to provide the amplitude and phase of each torque ripple harmonic as a function of the actuator operating condition. Based on testing that has been performed so far, the operating condition variables of interest will be line current RMS amplitude and (to a lesser degree) motor velocity.

There are many servo-motor applications where neither the load nor the servo motion profile is known a-priori; for example actuators for control-surfaces on a boat or submarine. These applications present the most challenging case for adaptive torque ripple cancellation control. In this type of application, the optimal compensation current (as a function of motor shaft angle) will be a moving target and we will have no a-priori information at all for how it will change during operation. In this situation we can simply employ the continuous online adaptation approach; however its performance will suffer during periods where the optimal control parameters (load torque or friction) change more rapidly than the algorithm's adaptation time constant.

Even in this more general operating scenario where servo motion profiles and load characteristics are not know a-priori, the vast majority of applications will encounter common operating conditions on a regularly repetitive basis (albeit not easily predictable). An obvious shortcoming of our baseline continuous online adaptation approach is that is essentially has to "re-adapt" to a particular operating condition each time it is encountered. It is easy to see in principle that the system would perform better if it could somehow "remember" where it had left off in the adaptation process at a previously encountered operating condition.

In more servo-motor applications it will be necessary to "break up" the torque ripple response data into windowed subsections that can be associated with finite ranges of operating condition. There will be trades here between angle resolution and angular wavenumber resolution (a consequence of the Fourier uncertainty principle). We know that motor current amplitude affects changes in the optimal control parameters for torque ripple cancellation as a function of motor shaft angle. Motor speed will also influence pole and slot passing effects due to associated eddy current and hysteresis losses. Motor current is the most critical parameter since it affects changes in many harmonics and current typically changes much more rapidly than velocity. We have focused on motor current (instantaneous rms) as our scheduling variable for the control parameters which relate motor shaft position to the compensating current command $i_c$. This approach is "Continuous online adaptation with control parameter scheduling."

Figure 34:
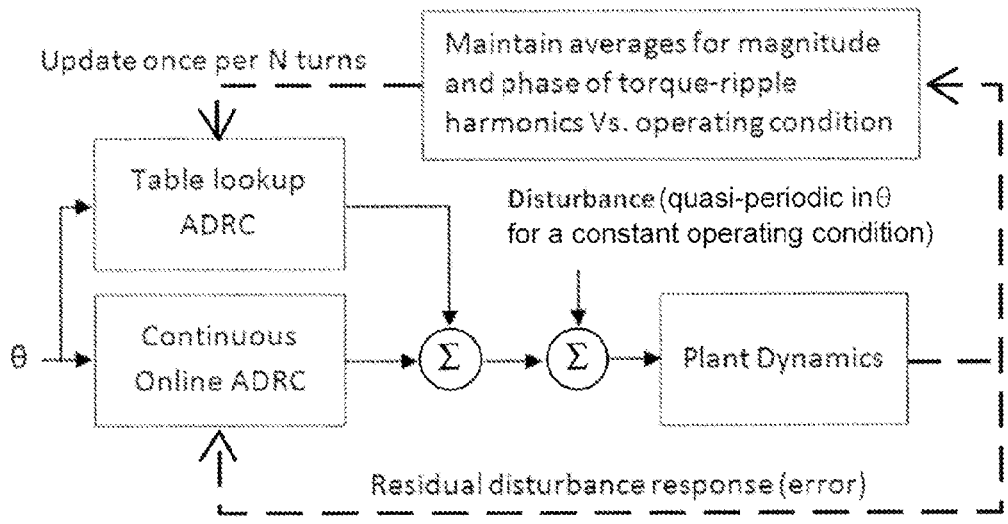
FIG. 34 is a signal flow diagram for a continuous online adaptation for ADRC.

Continuous online adaptation with control parameter scheduling is by far the most complex concept. It can be viewed as an extension of the wavenumber domain continuous online ADRC, which can store information about any combination of arbitrary operating conditions which may be encountered during operation. A conceptual signal flow diagram is shown for this approach in FIG. 34.

This algorithm uses a block-wise signal processing approach, gathering data N turns at a time (N is a design parameter and could be a large number). The lookup tables will be updated once per block. Therefore it is likely that this continuous online adaptation with control parameter scheduling will include the "on the fly" adaptation methods we described earlier to work in parallel with the scheduled control parameter updates to address any drift in optimal control parameters in between table updates.

Figure 35:
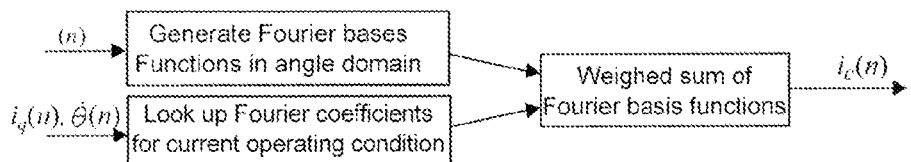
FIG. 35 is a flow chart for an ideal (lookup table) torque ripple cancellation controller.

As illustrated in FIG. 35, in a perfect world, we would have at our disposal a lookup table of complex valued Fourier coefficients for each of the torque ripple harmonics we'd like to cancel, with values available for every operating condition we might encounter while operating the servo drive. Each time slice the torque-ripple controller would read the values of the scheduling variables (motor current $i_q(n)$ for example), and then interpolate appropriate Fourier coefficients from the lookup table. The interpolated Fourier coefficients would weight sinusoidal basis functions driven by the motor shaft encoder, and the weighted sum would constitute the controller's compensating current command $i_c(n)$.

It would be tedious at best to require a special test to characterize each motor/drive system at every foreseeable operating condition; dwelling at each operating condition to obtain steady-state data from which to compute Fourier coefficients. Furthermore, we need the ability to track trends in the servo drive torque ripple as they may change slowly throughout its service life, even with respect to a given set of operating conditions. Therefore we require signal processing techniques that enable us to develop such a table from measurements during normal operation of the servo drive.

Our previously described algorithms for Continuous Online ADRC used sinusoids (sine and cosine functions of multiples of the motor shaft angle) as basis functions for characterization of the torque ripple response e(n). This was appropriate for the continuous adaptation concept, since it was based on tracking the (approximate) Fourier coefficients of a quasi-periodic signal. But in this more general operational scenario, we are trying to form a basis for dealing with highly non-stationary signals, where ripple parameters (the magnitude and phase of each constituent harmonic) may change abruptly and often. Furthermore, we need to be able to associate sets of torque ripple parameters with a set of scheduled operating conditions. During normal operations we may encounter operating conditions briefly and intermittently, making it difficult to properly associate estimated torque-ripple parameters with the appropriate operating conditions.

In this scenario, we are subject to the "Fourier Uncertainty Principle". Simply stated, for a function $f(\theta)$ (a function of motor shaft angle) having the Fourier transform $F(\Omega)$ (a function of wavenumber or harmonic number), the more we attempt to pinpoint the wavenumber $\Omega$ (increased resolution in $F(\Omega)$) the more samples are required in $\theta$ (longer range in $\theta$), and therefore the "fuzzier" our knowledge is with regard to what value of $\theta$ where the harmonic $\Omega$ occurs. An intuitive consequence of the uncertainty principle is that we can better pinpoint the motor shaft angle where a particular amplitude and phase of torque ripple harmonic $\Omega$, for large values of $\Omega$ (short wavelengths), because their magnitude and phase can be estimated within a shorter interval in $\theta$. Unfortunately, the Fourier transform does not allow for optimization of this tradeoff, since it uses a single record length (range in $\theta$) to compute all the harmonics.

Surveys of the literature and some simulation investigations have indicated that the Discrete Orthogonal Stockwell Transform (DOST) is a good candidate basis function for the parameterization of torque ripple response in general transient servo operational scenarios.

Figure 36:
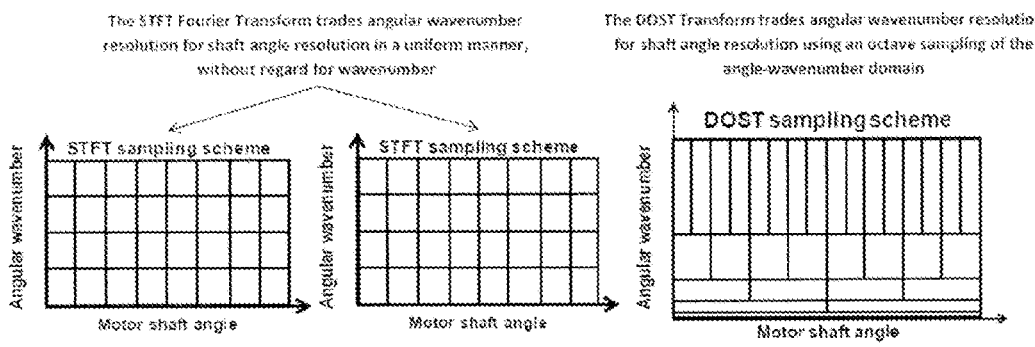
FIG. 36 is a series of graphs that illustrate the manner in which the DOST decomposes a signal into the angle-wavenumber domain using an octave sampling scheme.

FIG. 36 illustrates the manner in which the DOST decomposes a signal into the angle-wavenumber domain using an octave sampling scheme.

The DOST is preferable to techniques such as Short Time Fourier Transform (STFT) because it samples the angle-wavenumber domain in a more optimal way. The progressive resolution evident in is the result of an octave sampling scheme where wavenumber resolution is traded for angle resolution (similar to the wavelet transform).

The Discrete Orthogonal Stockwell Transform (DOST) yields localization in both the angle and the wavenumber domain. The DOST is similar to the Wavelet transform but with the important distinction that it retains an absolute phase reference and a more direct relationship with the FFT. DOST samples the angle and wavenumber domains in an optimal way that yields an efficient orthogonal transform which can be computed using existing FFT algorithms combined with some additional transformations.

A sampled time domain signal h[kT] may be transformed into the DOST domain via the transform equation:

$$S\{h[kT]\} = S\left(\tau T, \frac{v}{NT}\right) = \sum_{k=0}^{k=N-1} h[kT] S_{[v,\beta,\tau]}[kT]$$

The DOST basis functions are a function of three parameters: $v$ (voice index), $\beta$ (voice bandwidth) and $\tau$ (angle shift index). Voice bandwidth is a function of voice index, per the octave sampling scheme.

$$S_{[v,\beta,\tau]}[kT] = \frac{ie^{-i\pi\tau}}{\sqrt{\beta}} \sum_{f=v-\beta/2}^{f=v+\beta/2-1} e^{i2\pi(k/N-\tau/\beta)f} =$$

$$\frac{ie^{-i\pi\tau}}{\sqrt{\beta}} \frac{\{e^{-i2\pi(k/N-\tau/\beta)(v-\beta/2-1/2)} - e^{-i2\pi(k/N-\tau/\beta)(v+\beta/2-1/2)}\}}{2\sin(\pi(k/N-\tau/\beta))}$$

Figure 37:
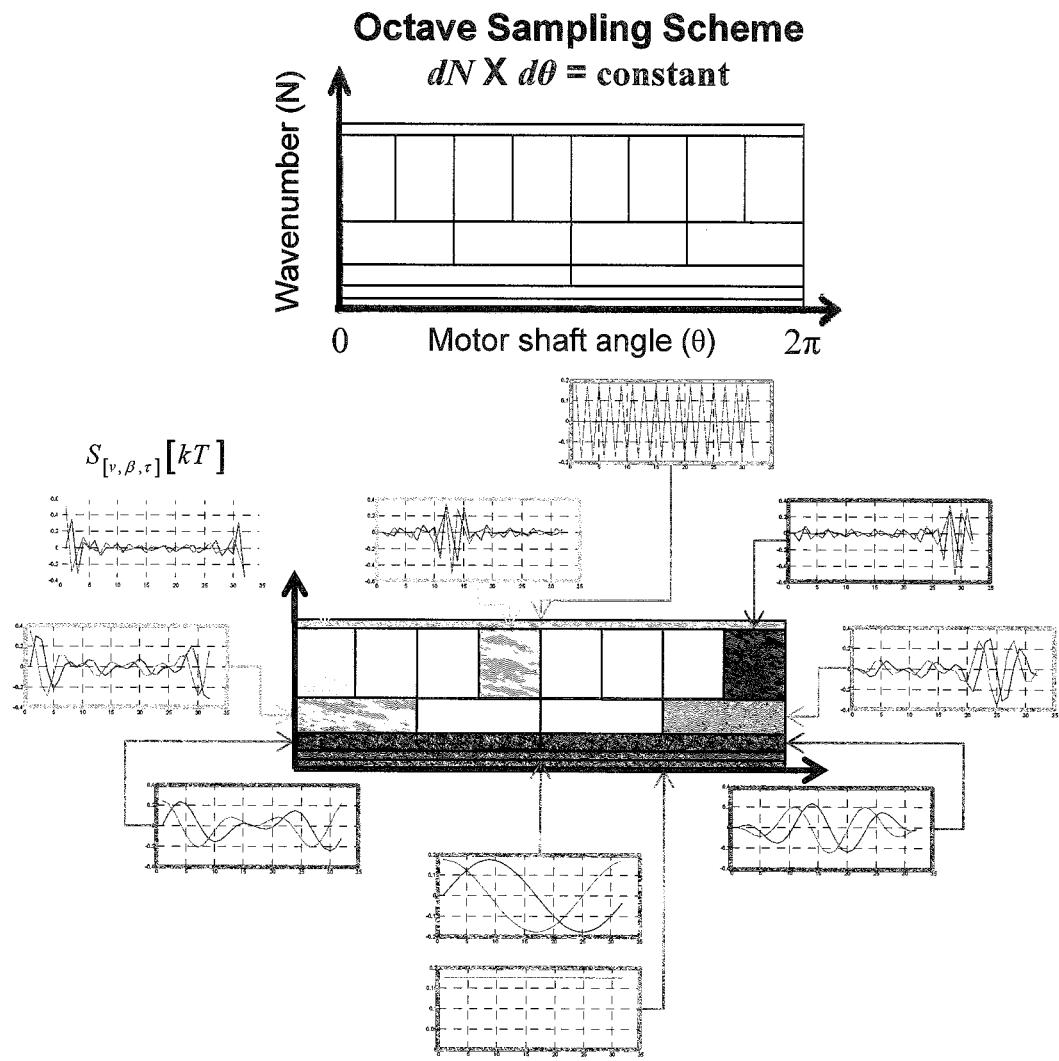
FIG. 37 is a diagram illustrating a visualization of selected DOST basis functions.

The Dost basis functions are combined in wavenumber bands referred to as "voices". These voices yield compact support in wavenumber (i.e. there is no overlap of information in the wavenumber domain between voices). And the individual basis functions within a given voice provide localization in angle (not compact, but at least "concentrated" within a particular window). One can think of each voice as a sum of sinusoids equal in magnitude with relative phase such that the interference pattern yields localization in angle. With increasing wavenumber the number of wavenumbers in a voice increases (less localization in wavenumber) and a basis function corresponding to delay tau start to look more and more like an impulse function centered at tau (more localization in angle). A visualization of selected basis functions for a series of length 32 (only positive wavenumbers shown) is shown in FIG. 37.

We selected a DOST basis for parameterization of the measured torque ripple response. Rather than a single set of torque ripple response parameters (DOST coefficients), we need to create and maintain a multi-dimensional table of DOST coefficients. 2-D tables store DOST coefficients for a finite set of iq values. The DOST coefficient table updates (adaptation) need to be done with regard to which scheduled iq value corresponds to each DOST coefficient. Algorithms for updating and retrieving DOST coefficients are complicated by the fact that some operating conditions may be encountered only briefly (a fraction of a shaft rotation) during transient operations. This underlines the importance of the angle localization property of the DOST, which allows individual coefficients to be localized in motor shaft angle and thereby associated with the appropriate operating condition when tabulated.

Figure 38:
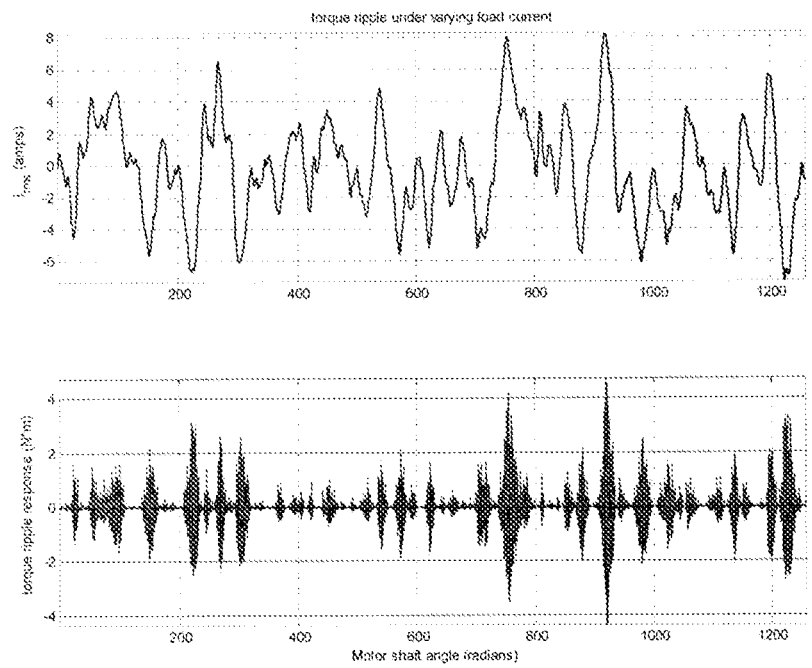
FIG. 38 shows a simulated servoing application for parameterization of the measured torque ripple response in terms of the DOST and the operating condition scheduling variable (motor current amplitude)

FIG. 38 shows a simulated servoing application we consider for parameterization of the measured torque ripple response in terms of the DOST and our operating condition scheduling variable (motor current amplitude). The data shown here constitutes 200 turns of the motor shaft.

The challenge at hand is to utilize data gathered during normal actuator operation to characterize the measured torque ripple response as a function of the operating condition. We need to populate lookup tables of torque ripple parameters during normal operation, as opposed to requiring a special test procedure to gather steady state data at scheduled operating points. The transient and unpredictable operating conditions of normal actuator operation make this a challenge. Stored torque ripple parameters need to be scheduled vs. one or more known operating point variables (in our simulated example we will just focus on motor current amplitude)

The first stage of the table based torque ripple control is the acquisition stage. A block of data for N motor shaft turns is acquired and stored in memory. As e(n) is acquired for each turn it is pre-filtered by the inverse plant dynamics and re-sampled to yield e'(θ) (a rough estimate of the compensating current command that would cancel the torque ripple).

The current concept for signal buffering is to provide a finite time-domain buffer. The length of the buffer is such that it can store the time history data of interest for a complete revolution of the motor shaft at a sample rate of 10 kHz while the motor is rotating at a minimum RPM=60ω/2π. The minimum RPM for a given application is determined such that phase error due to the secondary path dynamics is negligible (say, less than 20 degrees) for the highest torque ripple harmonic being compensated. For example, if the critical frequency $f_c$ above which secondary path dynamics are non-negligible is 300 Hz, and we wish to compensate up to harmonic N=150, then the critical RPM is given by:

$$RPM_c = \frac{f_c(60)}{N} = \frac{300(60)}{150} = 120$$

This requires that the buffer hold 20,000 time samples of the data set.

But in this scenario, what if the motor were operating at, say 80 RPM? Because the secondary path dynamics are negligible below 120 RPM, the inversion of the plant dynamics (a frequency domain batch-mode operation) can be omitted and the data can simply be re-sampled as a function of motor shaft angle and stored in an angle-domain buffer. When that buffer is full it will be processed via the DOST transform.

Two buffers are maintained. The buffers include a time domain buffer, used for RPMs above the critical RPM (under which the time domain buffer would overflow and over which the secondary path dynamics are non-negligible), and an angle domain buffer, used for RPMs below the critical RPM, for which the secondary path dynamics are negligible, and for which we can simply re-sample the torque ripple response (on the fly) as a function of the motor shaft angle.

Figure 39:
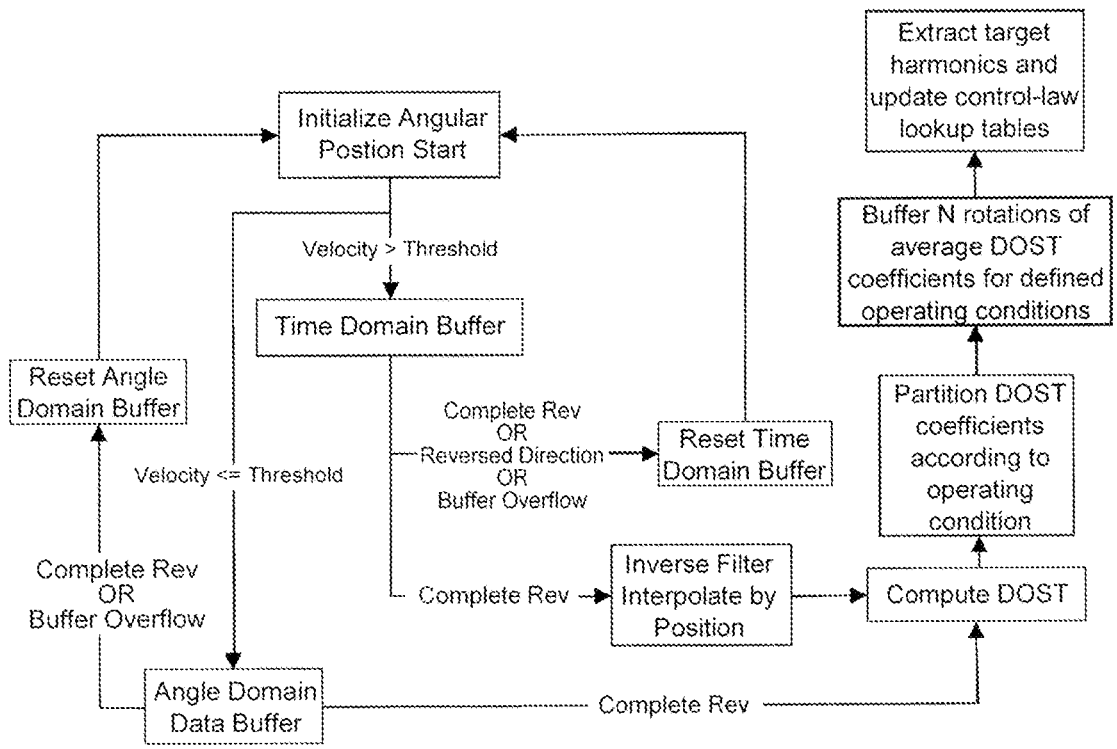
FIG. 39 is a flow chart for the data acquisition stage and inverse filtering operations.

The buffering and secondary path compensation logic flow-chart is outlined in FIG. 39. Also see FIG. 43 for overall signal flow diagram.

Next e'(θ) is transformed via the DOST to E'(ν,β,τ). Upon completing the computation of E'(ν,β,τ) for a given motor turn, the (DOST) coefficients of must be distributed to the appropriate operating condition bins in a multi-dimensional table which associates each DOST coefficient with the proper operating condition. This is described in detail in the following sections.

Figure 40:
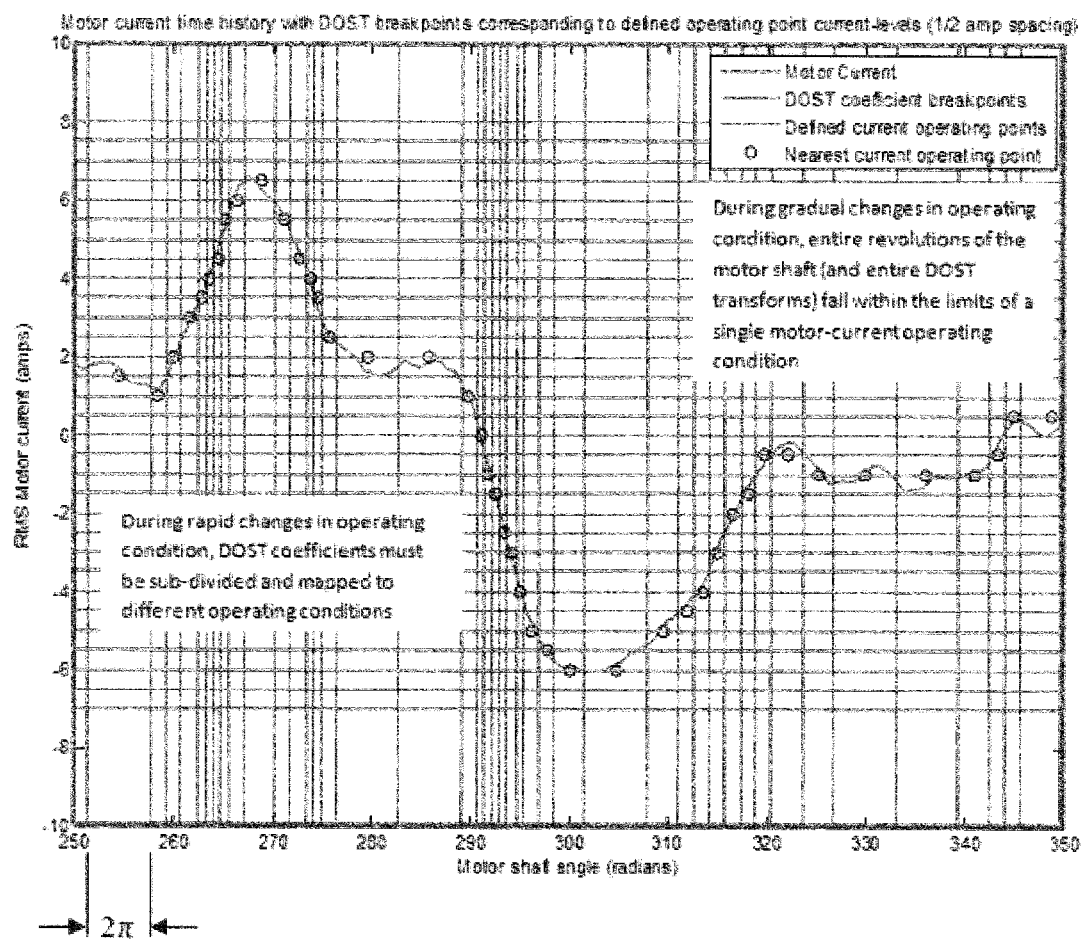
FIG. 40 is a graph showing the angle history of scheduling variable (amplitude of torque producing current)

Focusing in on a small portion of the motor current time history in FIG. 40, we see that (depending on the size of the scheduling parameter bin widths and the speed of the motor) some operating conditions are encountered for less than a full rotation of the motor shaft.

This requires that we employ an octave partitioning scheme to match pieces of the angle history that fall within the scheduling variable bin widths to appropriate subsections of the DOST transform (which contains a complete mechanical rotation of the motor shaft). The results of a partitioning algorithm identify the operating condition bins which correspond to subsections of the motor shaft angle history. The measured torque ripple response e(n) is transformed via the DOST to E'(ν,β,τ) and subsets of this DOST transform can be placed in the portions of the lookup table corresponding to the appropriate operating condition bin.

Figure 41:
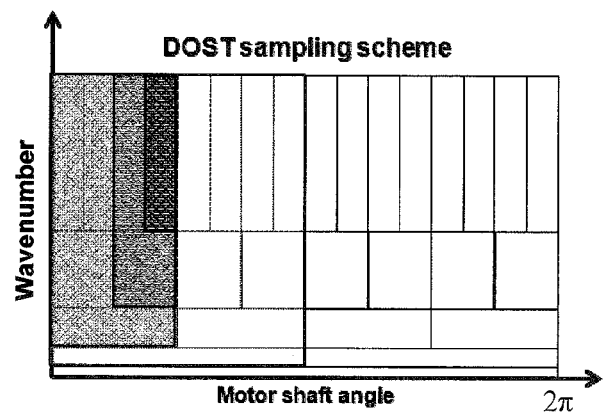
FIG. 41 illustrates how narrower windows of motor shaft rotation can be mapped to subsets of a DOST transform that encapsulates an entire revolution of the motor shaft.

FIG. 41 shows how narrower windows of motor shaft rotation can be mapped to subsets of a DOST transform that encapsulates an entire revolution of the motor shaft.

The octave sampling scheme of the DOST is extremely useful in this application because it allows us to piece together a picture of what the steady state torque-ripple looks like at a given operating condition even though we may never actually measure any steady state operation. The DOST allow us to piece together the steady state picture from brief, intermittent encounters with an operating condition of interest, potentially using data gathered over long periods of time (a block processing scheme is used and the block size is a design parameter). Averaging of the DOST coefficients for a given operating condition is performed on an element by element basis, since we may encounter subsets of its coefficients any number of times.

Figure 42:
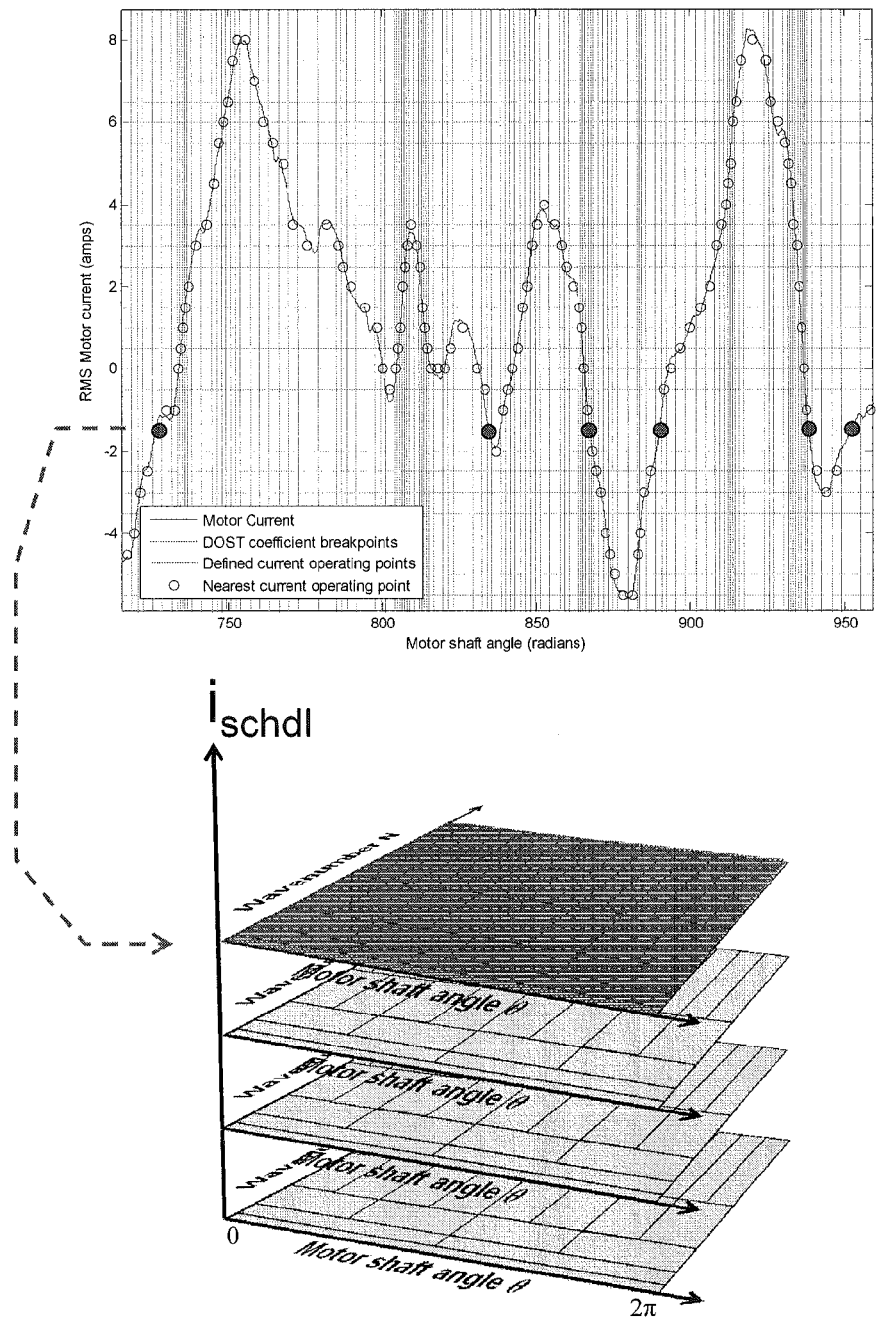
FIG. 42 illustrates an example of mapping of several angle windows corresponding to a current iq of −1.5 amps to the DOST table.

As the DOST transforms E'(ν,β,τ) are computed we must direct them to the appropriate bins in the multidimensional table which encapsulates a complete DOST transform for each scheduled operating condition. Since we cannot know ahead of time how many times we will encounter a particular subset of the DOST for any particular operating condition, we simply maintain a running sum of DOST coefficients in one data structure, and a running sum of addition operations in a parallel data structure. When the block of data has been completely reduced, then we perform an element-wise division of the DOST coefficients by the addition operations count to yield an average DOST for each scheduled operating condition. FIG. 42 illustrates the concept of a DOST table covering a range of schedule operating conditions (illustrated for just one scheduling variable: motor current). FIG. 42 illustrates an example mapping of several angle windows corresponding to a current $i_q$ of −1.5 amps to the DOST table.

The final step towards updating the ADRC control parameters is to extract the wavenumbers corresponding to torque ripple harmonics targeted for cancellation. At this point in the process (the end of a block) the DOST table contains averaged DOST data extracted from normal operating data. Data quality is best for operating conditions encountered more often as these coefficients will be the result for a larger number of averages.

Figure 48:
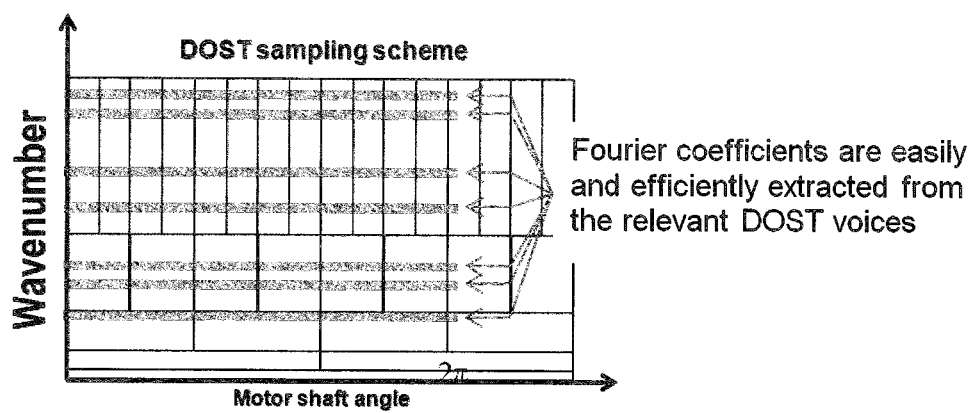
FIG. 48 illustrates Fourier coefficients across the entire range of the DOST within the voices that contain the wavenumbers of interest.

As shown in FIG. 48, Fourier coefficients are recovered using data across the entire (2π radians) range of the DOST within the voices which contain the wavenumbers of interest.

The process of extracting Fourier coefficients from the DOST voices amounts to the application of a phase ramp and FFT operation to the DOST coefficients corresponding to that voice.

Once Fourier coefficients for the targeted torque ripple harmonics have been extracted from the DOST tables, they are multiplied by the step size u and added to the control parameter lookup table. Similar to the Block-Wise Offline adaptation method, we do not attempt to converge to the ideal controller parameters in one step. Because of DOST table interpolation errors, measurement noise and errors in our knowledge of H2(s), we still have to take the gradient descent approach and choose a value of μ that is less than 1. As usual the value of μ will be a tradeoff between speed of convergence and noise introduced into the adaptation of the controller parameters.

Figure 43:
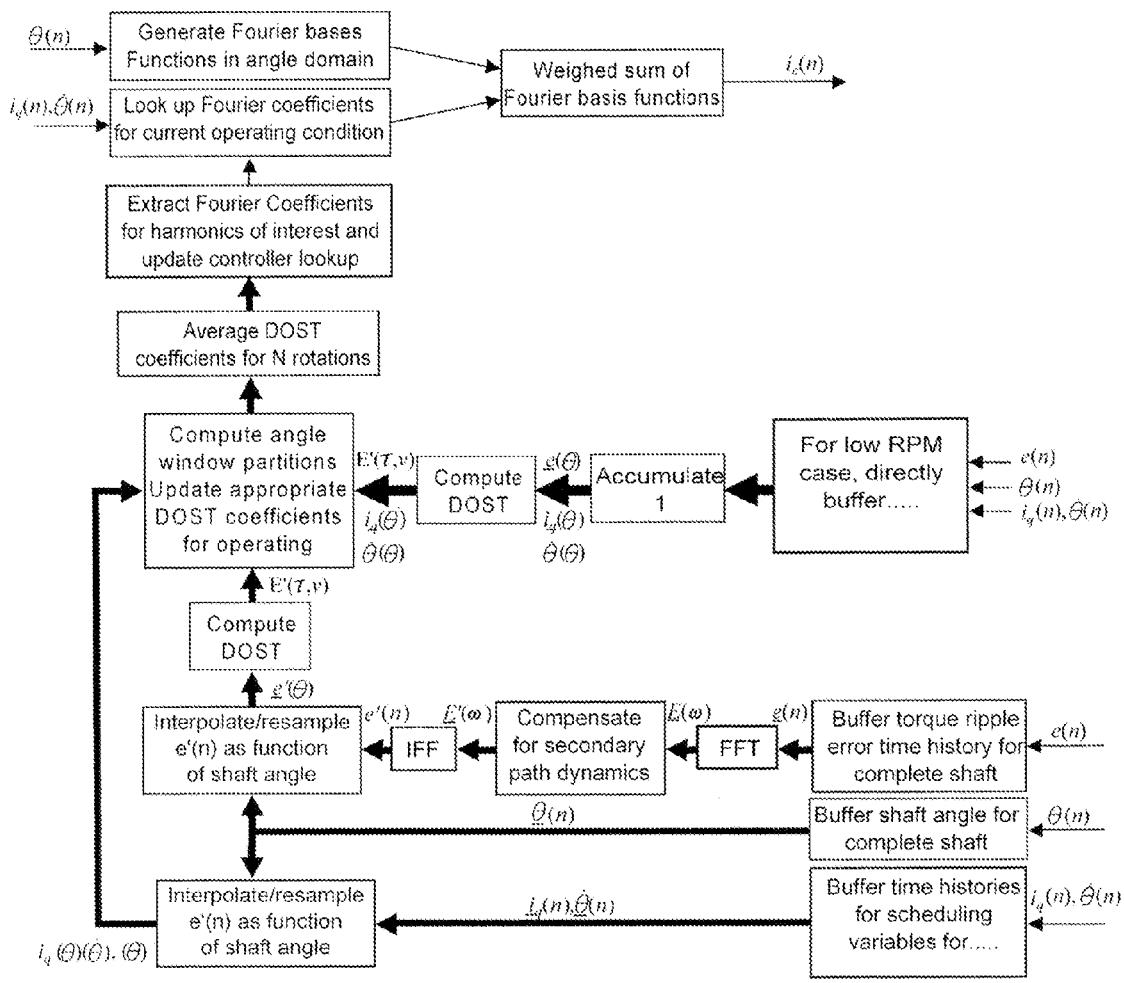
FIG. 43 is a block diagram for continuous online adaptation with control parameter scheduling.

Each time we update the control parameters, we reset the data buffers and begin a new block of data acquisition to characterize the measured response to the remaining torque ripple, and so on. This iterative process will continue until all the predictable energy at the targeted torque ripple wavenumbers has been canceled. FIG. 43 summarizes the entire algorithm in a signal flow diagram.

Figures 44, 45:
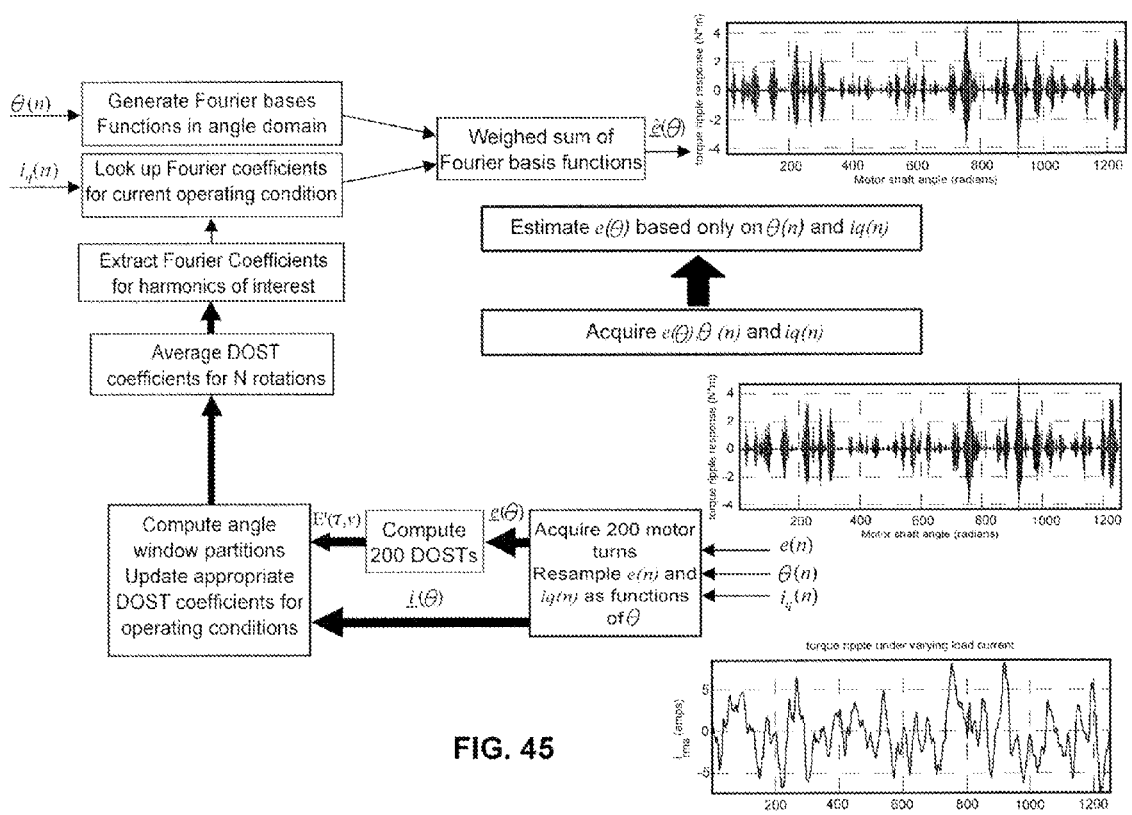
FIG. 44 is a timing diagram for continuous online adaptation with control parameter scheduling.
FIG. 45 illustrates the subset of the overall continuous online adaptation with a control parameter scheduling algorithm that has been validated in simulation.

The control parameters employed at the output stage are still Fourier coefficients, and the output stage is identical to that employed in the Continuous Online Adaptation approach described earlier. The key difference is that the control parameters (Fourier coefficients) are interpolated from lookup tables which schedule control parameters with respect to operating condition. The order of processing envisioned for this ADRC approach is shown in FIG. 44. Note that the output stage is constantly running but that some dead time (TBD) occurs between blocks to allow the signal processing to catch up and for the control parameters to be updated based on the post-processed data from the previous block.

Such a gap in data acquisition should not be an issue. The data acquisition duty cycle will be determined by the implementation of this algorithm, depending on the computational resources, and the chosen block length (number of motor revolutions acquired per block).

The novel signal processing steps required to implement Continuous Online Adaptation with Control Parameter Scheduling have been coded in Matlab and verified in simulation.

What we have simulated amounts to a single long block (200 motor turns) of the torque-ripple response parameterization. As a validation of the signal processing steps we have coded the following: Simulated acquisition of $e(\theta)$, $\theta(n)$ and $iq(n)$ for 200 motor shaft revolutions; compute DOSTs for all 200 turns; compute angle window partitioning for single scheduling variable (motor current) with ½ amp bind widths over a range of +/−4.5 amps; average data from all 200 DOSTs, mapping acquired DOST coefficients to appropriate bins in DOST table with respect to motor current scheduling; extract torque ripple Fourier coefficients from DOST voices and construct lookup table of torque ripple Fourier coefficients vs. scheduled motor current values; and reconstruct an estimate of the originally acquired torque ripple response $e(\theta)$ based only on the measured current $iq(n)$, motor shaft angle $\theta(n)$ and the torque-ripple Fourier coefficient lookup table from (5)

FIG. 45 illustrates the subset of the overall Continuous Online Adaptation with Control Parameter Scheduling algorithm that has been validated in simulation.

The simulation results show a surprisingly excellent overlay of the simulated torque ripple response, and the estimate that was regenerated from the Fourier coefficient lookup table using only the known motor current and shaft angle to interpolate Fourier coefficients. This approach makes very efficient use of normal operational data, allowing it to be disassembled and reassembled into a mosaic which approximates data that would normally require steady-state testing to obtain.

Accordingly, the robust signal processing technique enables the use of normal operating data with lots of transients to accurately characterize torque-ripple. This technique eliminates the need for tedious testing to characterize torque ripple at operating conditions of interest, and allows an ADRC system to continuously self-tune under normal operating conditions.

The present invention contemplates that many changes and modifications may be made. Therefore, while the presently-preferred form of the adaptive actuator control system has been shown and described, and several modifications and alternatives discussed, persons skilled in this art will readily appreciate that various additional changes and modifications may be made without departing from the spirit of the invention, as defined and differentiated by the following claims.

The invention claimed is:

1. An adaptive motor control system, comprising:
    an input for receiving a predetermined current command ($I_{qc}$) corresponding to a desired output torque;
    an input for receiving a sensed motor shaft angular position ($\theta$);
    an input for receiving a measured response ($y_2$) signal from a sensor;
    a processor configured to run an adaptive algorithm, wherein said algorithm comprises,
    an adaptive torque ripple cancellation stage configured to produce a torque ripple cancellation signal ($i_c$) as a function of said predetermined current command, said sensed angle, and said measured response;
    a model reference adaptive inverse controller configured to produce a current command adjustment to effect a delayed $y_2$ response proportional to said torque ripple cancellation signal and said measured response;
    an active damping feedback control loop configured to produce a damping signal as a function of said measured response;
    a summation block configured to produce an output current command signal as a function of said current command adjustment, said predetermined current command and said damping signal;
    wherein said algorithm is configured to cause a motor driven by said output current signal to produce the desired output torque with reduced noise.

2. The adaptive motor control system of claim 1, wherein the measured response is detected by a sensor.

3. The adaptive motor control system of claim 2, wherein the sensor comprises a load cell.

4. The adaptive motor control system of claim 2, wherein the sensor comprises a gyroscope.

5. The adaptive motor control system of claim 2, wherein the sensor comprises an accelerometer.

6. The adaptive motor control system of claim 5, wherein said sensor is mechanically coupled to a load driven by said motor.

7. The adaptive motor control system of claim 1, wherein the motor is a brushless DC motor.

8. The adaptive motor control system of claim 1, wherein the adaptive torque ripple cancellation stage comprises an adaptive disturbance rejection controller (ADRC) which comprises continuous online adaptation in the angle domain.

9. The adaptive motor control system of claim 8, wherein continuous online adaptation in the angle domain comprises a filtered xLMS algorithm.

10. The adaptive motor control system of claim 1, wherein the adaptive torque ripple cancellation stage comprises a continuous online adaptation in the wavenumber domain.

11. The adaptive motor control system of claim 10, wherein said continuous online adaptation in the wavenumber domain comprises a filtered xLMS algorithm.

12. The adaptive motor control system of claim 1, wherein the adaptive torque ripple cancellation stage comprises an adaptive disturbance rejection controller (ADRC) which comprises hybrid continuous online adaptation that includes a continuous online adaptation in the motor shaft angle domain implemented in parallel with a continuous online adaptation in the wavenumber domain.

13. The adaptive motor control system of claim 1, wherein the adaptive torque ripple cancellation stage comprises an adaptive disturbance rejection controller (ADRC) which comprises hybrid adaptation that includes a continuous online adaptation in the motor shaft angle domain implemented in parallel with an offline adaptation in the wavenumber domain.

14. The adaptive motor control system of claim 1, wherein the adaptive torque ripple cancellation stage comprises a continuous online adaptation with control parameter scheduling.

15. The adaptive motor control system of claim 1, wherein the model reference adaptive inverse controller comprises a filter which approximates a delayed inverse of a plant.

16. The adaptive motor control system of claim 1, wherein said function in the active damping feedback control loop comprises a filter configured to damp a targeted vibration mode.

17. The adaptive motor control system of claim 1, and further comprising a temperature input, wherein said algorithm schedules parameters as a function of said temperature input.

18. A method of adaptively controlling a motor, the method comprising:
receiving a predetermined current command (Iqc) corresponding to a desired output torque;
sensing a motor shaft angular position ($\theta$);
receiving a measured response (y2);
providing a processor configured to run an adaptive algorithm;
providing a torque ripple cancellation signal (ic) as a function of said predetermined current command, said sensed angle, and said measured response using an adaptive torque ripple cancellation stage on said processor;
producing a current command adjustment to effect a delayed y2 response proportional to said torque ripple cancellation signal and said measured response using a model reference adaptive inverse controller;
producing a damping signal as a function of said measured response using an active damping feedback control loop;
producing an output current command signal as a function of said current command adjustment, said predetermined current command, and said damping signal; and,
causing a motor driven by said output current signal to produce the desired output torque with reduced noise.

19. The method of claim 18, wherein the measured response is detected by an accelerometer.

20. The method of claim 19, wherein the accelerometer is disposed on a housing for said motor.

21. The method of claim 18, wherein the measured response is detected by a load cell.

22. The method of claim 21, wherein the load cell is positioned on a support structure for the motor.

23. The method of claim 18, wherein the motor is operatively connected to an electromechanical actuator.

24. The method of claim 18, wherein the motor is a brushless DC motor.

25. An adaptive motor control system, comprising:
means for receiving a predetermined current command ($I_{qc}$) corresponding to a desired output torque;
means for receiving a sensed motor shaft angular position ($\theta$);
means for receiving a measured response ($y_2$) signal from a sensor;
means for running an adaptive algorithm, wherein said algorithm comprises,
means for producing an adaptive torque ripple cancellation signal ($i_c$) as a function of said predetermined current command, said sensed angle, and said measured response;
means for effecting a delayed $y_2$ response proportional to said torque ripple cancellation signal and said measured response;
means for damping a targeted vibration mode of said measured response;
means for producing an output current command signal as a function of said current command adjustment, said predetermined current command and said damping signal;
wherein said algorithm is configured to cause a motor driven by said output current signal to produce the desired output torque with reduced noise.

26. The adaptive motor control system of claim 25, wherein the measured response is detected by an accelerometer.

27. The adaptive motor control system of claim 26, wherein the accelerometer is disposed on a housing for said motor.

28. The adaptive motor control system of claim 25, wherein the measured response is detected by a load cell.

29. The adaptive motor control system of claim 28, wherein the load cell is positioned on a support structure for the motor.

30. The adaptive motor control system of claim 25, wherein said sensor is mechanically coupled to a load driven by said motor.

31. The adaptive motor control system of claim 25, wherein the adaptive torque ripple cancellation stage comprises a continuous online adaptation in the wavenumber domain.

32. The adaptive motor control system of claim 31, wherein said continuous online adaptation in the wavenumber domain comprises a filtered xLMS algorithm.

33. The adaptive motor control system of claim 25, wherein the adaptive torque ripple cancellation stage comprises an adaptive disturbance rejection controller (ADRC) which comprises a hybrid continuous online adaptation that includes a continuous online adaptation in the motor shaft angle domain implemented in parallel with a continuous online adaptation in the wavenumber domain.

34. The adaptive motor control system of claim 25, wherein the adaptive torque ripple cancellation stage comprises a continuous online adaptation with control parameter scheduling.

* * * * *